(12) United States Patent
Lang et al.

(10) Patent No.: US 11,542,353 B2
(45) Date of Patent: Jan. 3, 2023

(54) METHOD FOR PRODUCING PHOTOCHROMIC CONTACT LENSES

(71) Applicant: Alcon Inc., Fribourg (CH)

(72) Inventors: Weihong Lang, Suwanee, GA (US); Junhao Ge, Johns Creek, GA (US); Steve Yun Zhang, Sugar Hill, GA (US); Daqing Wu, Suwanee, GA (US)

(73) Assignee: Alcon Inc., Fribourg (CH)

( * ) Notice: Subject to any disclaimer, the term of this patent is extended or adjusted under 35 U.S.C. 154(b) by 431 days.

(21) Appl. No.: 16/872,628

(22) Filed: May 12, 2020

(65) Prior Publication Data

US 2020/0362082 A1 Nov. 19, 2020

Related U.S. Application Data

(60) Provisional application No. 62/846,921, filed on May 13, 2019.

(51) Int. Cl.
*C08F 271/02* (2006.01)
*B29D 11/00* (2006.01)
(Continued)

(52) U.S. Cl.
CPC ...... *C08F 271/02* (2013.01); *B29D 11/00038* (2013.01); *C08K 5/1545* (2013.01);
(Continued)

(58) Field of Classification Search
CPC .................................................. G02B 1/043
See application file for complete search history.

(56) References Cited

U.S. PATENT DOCUMENTS

| 4,136,250 A | 1/1979 | Mueller |
| 4,153,641 A | 5/1979 | Deichert et al. |

(Continued)

FOREIGN PATENT DOCUMENTS

| EP | 1117656 B1 | 5/2002 |
| EP | 2294114 B1 | 8/2012 |

(Continued)

OTHER PUBLICATIONS

John C. Crano et al., Photochromic Compounds: Chemistry and Application in Ophthalmic Lenses, Pure and Applied Chemistry, vol. 68, No. 7, 1996, pp. 1395-1398.

*Primary Examiner* — Michael F Pepitone
(74) *Attorney, Agent, or Firm* — Jian Zhou

(57) ABSTRACT

The invention provides a method for producing photochromic silicone hydrogel (SiHy) contact lenses based on thermal cast-molding technology in a relatively efficient and consistent manner. The method is characterized by selecting a high radical-reactive hydrophilic acrylic monomer while eliminating any low radical-reactive hydrophilic N-vinyl amide monomer in a lens formulation (polymerizable composition), by selecting a weight ratio of low-radical-reactive hydrophilic N-vinyl amide monomer to a high radical-reactive hydrophilic acrylic monomer in a lens formulation if the low radical-reactive hydrophilic N-vinyl amide monomer is needed, and/or by using a relatively high temperature thermal initiator in a lens formulation, to control the lens properties (e.g., water content, elastic modulus, etc.) and lens processability (capability of dry-delensing from molds) of thermally cast-molded SiHy contact lenses while minimizing loss in photochromic ability of resultant SiHy contact lenses.

20 Claims, 6 Drawing Sheets

(51) Int. Cl.
  *C08K 5/1545* (2006.01)
  *C08K 5/17* (2006.01)
  *B29K 83/00* (2006.01)
  *B29K 105/00* (2006.01)
  *G02B 1/04* (2006.01)

(52) U.S. Cl.
  CPC ........ *C08K 5/175* (2013.01); *B29K 2083/005* (2013.01); *B29K 2105/0061* (2013.01); *C08F 2438/00* (2013.01); *G02B 1/043* (2013.01)

(56) References Cited

U.S. PATENT DOCUMENTS

| | | |
|---|---|---|
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,286,957 A | 9/1981 | Le Naour-Sene |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,681,412 A | 7/1987 | Lemelson |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,929,693 A | 5/1990 | Akashi |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,114,261 A | 5/1992 | Sugimoto |
| 5,139,707 A | 8/1992 | Guglielmetti |
| 5,166,345 A | 11/1992 | Akashi |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,017,121 A | 1/2000 | Chateau |
| 6,019,914 A | 2/2000 | Lokshin |
| 6,039,913 A | 3/2000 | Hirt et al. |
| 6,113,814 A | 9/2000 | Gemert |
| 6,149,841 A | 11/2000 | Kumar |
| 6,166,236 A | 12/2000 | Bambury |
| 6,174,464 B1 | 1/2001 | Garrity |
| 6,224,945 B1 | 5/2001 | Calderara |
| 6,296,785 B1 | 10/2001 | Nelson |
| 6,348,604 B1 | 2/2002 | Nelson |
| 6,762,264 B2 | 7/2004 | Kuenzler et al. |
| 6,867,245 B2 | 3/2005 | Iwata et al. |
| 7,214,809 B2 | 5/2007 | Zanini et al. |
| 7,261,844 B2 | 8/2007 | Tanikawa |
| 7,368,072 B2 | 5/2008 | Gemert |
| 7,423,074 B2 | 9/2008 | Lai |
| 7,465,414 B2 | 12/2008 | Knox |
| 7,556,750 B2 | 7/2009 | Xiao |
| 7,560,056 B2 | 7/2009 | Van Gemert |
| 7,584,630 B2 | 9/2009 | Van Gemert |
| 7,641,337 B2 | 1/2010 | Altmann |
| 7,999,989 B2 | 8/2011 | Asai |
| 8,133,274 B2 | 3/2012 | Zhou |
| 8,158,037 B2 | 4/2012 | Chopra |
| 8,415,405 B2 | 4/2013 | Maggio |
| 8,475,529 B2 | 7/2013 | Clarke |
| 8,529,057 B2 | 9/2013 | Qiu et al. |
| 8,614,261 B2 | 12/2013 | Iwata et al. |
| 8,658,748 B2 | 2/2014 | Liu |
| 8,697,770 B2 | 4/2014 | Duis |
| 8,741,188 B2 | 6/2014 | Chopra |
| 8,993,651 B2 | 3/2015 | Chang et al. |
| 9,052,438 B2 | 6/2015 | Xiao |
| 9,097,840 B2 | 8/2015 | Chang |
| 9,097,916 B2 | 8/2015 | Chopra |
| 9,103,965 B2 | 8/2015 | Chang |
| 9,217,813 B2 | 12/2015 | Liu |
| 9,377,569 B2 | 6/2016 | Ishak |
| 9,465,234 B2 | 10/2016 | Chopra |
| 9,475,827 B2 | 10/2016 | Chang |
| 9,904,074 B2 | 2/2018 | Duis |
| 10,197,707 B2 | 2/2019 | Xiao |
| 2011/0249235 A1* | 10/2011 | Duis ..................... G02C 7/102 264/1.36 |
| 2012/0026457 A1 | 2/2012 | Qiu |
| 2012/0088843 A1 | 4/2012 | Chang |
| 2012/0088844 A1 | 4/2012 | Kuyu |
| 2014/0098339 A1 | 4/2014 | Duis |
| 2017/0166673 A1 | 6/2017 | Huang |
| 2018/0100038 A1 | 4/2018 | Jing |
| 2018/0100053 A1 | 4/2018 | Jing |

FOREIGN PATENT DOCUMENTS

| | | |
|---|---|---|
| EP | 2705071 B1 | 3/2017 |
| EP | 3351565 B1 | 8/2020 |
| WO | 00/35902 A1 | 6/2000 |
| WO | 2010/020770 A1 | 2/2010 |
| WO | 2012/162725 A1 | 12/2012 |

\* cited by examiner

METHOD FOR PRODUCING PHOTOCHROMIC CONTACT LENSES

This application claims the benefit under 35 USC § 119 (e) of U.S. provisional application No. 62/846,921 filed 13 May 2019, herein incorporated by reference in its entirety.

The present invention relates to a method for producing photochromic contact lenses, in particular photochromic silicone hydrogel contact lenses having a desired equilibrium water content and desired mechanical properties.

BACKGROUND OF THE INVENTION

Conventionally, UV-absorbing compounds have been incorporated into contact lenses to make UV-absorbing contact lenses to protect eyes from UV-radiations. Recently, there have been proposed various photochromic contact lenses for protecting eyes from UV-radiations (see, e.g., U.S. Pat. Nos. 4,681,412, 6,017,121, 6,174,464, 6,224,945, 7,261,844, 7,368,072, 7,556,750, 7,560,056, 7,584,630, 7,641,337, 7,999,989, 8,158,037, 8,697,770, 8,741,188, 9,052,438, 9,097,916, 9,377,569, 9,465,234, 9,904,074, 10,197,707). Those proposed photochromic contact lenses contains photochromic compounds which are capable of undergoing a reversible color change, e.g., from "clear" to blue or other color, upon exposure to UV-irradiation and/or high-energy-violet light (HEVL).

One approach for incorporating a photochromic compound into contact lenses is to add a polymerizable photochromic compound in a polymerizable composition (i.e., lens formulation) for forming the contact lenses and then to use the obtained lens formulation to produce photochromic contact lenses according to a conventional cast-molding lens manufacturing process. Typically, a conventional cast-molding lens manufacturing process comprises: curing (polymerizing) of a polymerizable composition (lens formulation) within disposable plastic molds typically consisting of two mold halves; opening molds; optionally but preferably delensing (i.e., removing cast-molded lenses from the molds); and being subjected to various post-molding processes including extraction, hydration, packaging, and sterilization, etc. However, there are challenges in producing photochromic contact lenses from a lens formulation including a polymerizable or non-polymerizable photochromic compound according to such a conventional cast-molding lens manufacturing process. It is known that photochromic compounds can be sensitive to free radicals formed during the curing (polymerization) of a lens formulation. Under the effect of these free radicals, photochromic compounds are susceptible to degradation (decomposition) to generate colored by-products and lose their photoactivity (i.e., photochromic capability), or to interfering radical polymerization of a lens formulation, especially a lens formulation containing at least a hydrophilic N-vinyl amide monomer having a relatively low radical reactivity, through forming relatively-stable radicals so as to adversely affect the lens properties and processability (e.g., dry-delensing ability) of cast-molded lenses.

Therefore, there is still a need for a process for producing photochromic contact lenses, in particular, photochromic silicone hydrogel contact lenses having a desired lens properties and processability according to a conventional cast-molding technique.

SUMMARY OF THE INVENTION

The invention is directed to a method for producing photochromic silicone hydrogel contact lenses, comprising the step of:

(1) obtaining a polymerizable composition which is clear at room temperature, wherein the polymerizable composition comprises (a) at least one siloxane-containing polymerizable component which comprises at least one siloxane-containing vinylic monomer, at least one first polysiloxane vinylic crosslinker, or a combination thereof, (b) from about 25% to about 65% by weight of at least one hydrophilic polymerizable component relative to the total weight of the polymerizable composition, wherein said at least one hydrophilic polymerizable component comprises (i) at least one hydrophilic N-vinyl amide monomer and/or (ii) at least one hydrophilic acrylic monomer, (c) optionally but preferably at least one non-silicone vinylic crosslinker, (d) from about 5% to about 15% by weight of a hydrophobic acrylic monomer relative to the total weight of the polymerizable composition, wherein the hydrophobic acrylic monomer is capable of forming a homopolymer having a glass-transition temperature $T_g$ of at least about 60° C., wherein the hydrophobic acrylic monomer is capable of dissolving components (a) to (c) to form a solution with a concentration of at least about 5% by weight, (e) from 0 to about 16% by weight of at least one organic solvent having 2 to 8 carbon atoms relative to the total weight of the polymerizable composition, (f) at least one photochromic vinylic monomer, and (g) at least one thermal free radical initiator, wherein the sum of the amounts of components (a) to (c) is at least about 67% by weight relative to the total weight of the polymerizable composition, wherein weight ratio of component (d) over the sum of components (d) and (e) is at least 0.24;

(2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;

(3) curing thermally the polymerizable composition in the lens mold to form a unprocessed photochromic silicone hydrogel lens precursor; and (4) subjecting the unprocessed photochromic silicone hydrogel lens precursor to one or more post-molding processes selected from the group consisting of extraction, hydration, packaging, sterilization, and combinations thereof, to form a photochromic silicone hydrogel contact lens.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF PREFERRED EMBODIMENTS

Figure 1:
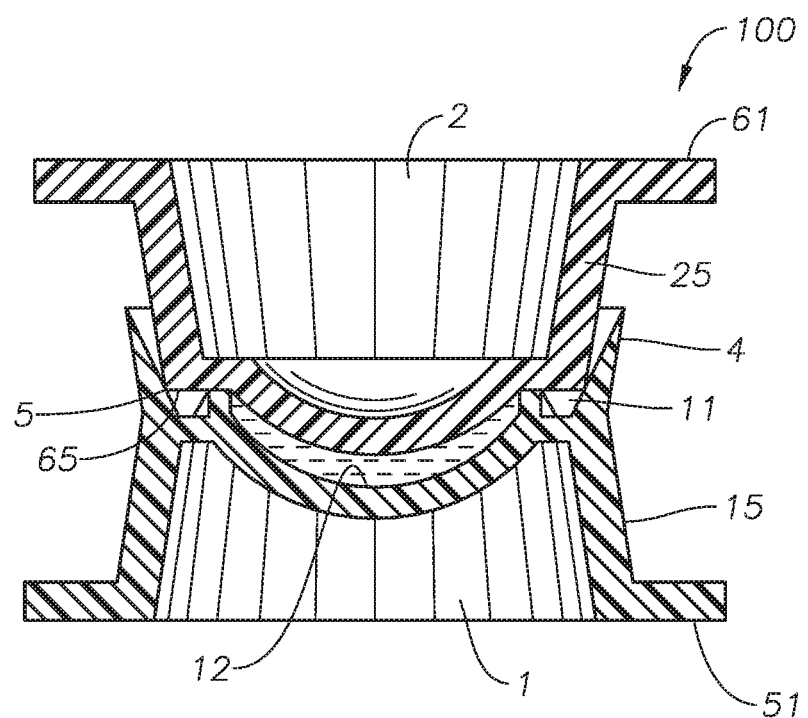
FIG. 1 is a cross-sectional view of a preferred mold.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Mere a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

The term "room temperature" refers to a temperature of about 21° C. to about 27° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.05% by weight at room temperature.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C<group. Exemplary ethylenically unsaturated groups include without limitation (meth)acryloyl

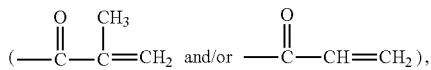

allyl, vinyl, styrenyl, or other C=C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

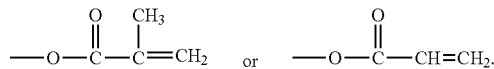

An "(meth)acrylamido monomer" refers to a vinylic monomer having one sole group of

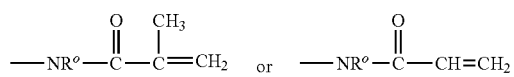

in which $R°$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

The term "terminal (meth)acryloyl group" refers to one (meth)acryloyl group at one of the two ends of the main chain (or backbone) of an organic compound as known to a person skilled in the art.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "blending vinylic monomer" refers to a vinylic monomer capable of dissolving both hydrophilic and hydrophobic components of a polymerizable composition to form a solution.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

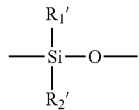

in which $R_1'$ and $R_2'$ are two substituents independently selected from the group consisting of $C_1$-$C_{10}$ alkyl, $C_1$-$C_4$-alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR° (in which alk is $C_1$-$C_6$ alkyl diradical, R° is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3'$R$_4'$, amino linkages of —NR$_3'$—, amide linkages of —CONR$_3'$—, amide of —CONR$_3'$R$_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A "thermal free radical initiator" refers to a chemical that initiates free radical crosslinking/polymerizing reaction by the use of heat energy.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation. A "SiHy lens formulation" refers to a polymerizable composition that comprises all necessary polymerizable components for producing a SiHy contact lens or a SiHy lens bulk material as well known to a person skilled in the art.

A "non-optical surface of a mold half" refers to mold half surface which does not contact the lens forming material during cast molding of a contact lens.

A "unprocessed silicone hydrogel lens precursor" or "dry silicone hydrogel lens precursor" interchangeably refers to a cast-molded article which consists essentially of a silicone hydrogel material and has not been contacted with water or any liquid after cast-molding.

The invention is generally related to a method for producing photochromic silicone hydrogel (SiHy) contact lenses in a relatively efficient and consistent manner. A method of the invention is characterized by selecting a high radical-reactive hydrophilic acrylic monomer while eliminating any low radical-reactive hydrophilic N-vinyl amide monomer in a lens formulation (polymerizable composition), by selecting a weight ratio of low-radical-reactive hydrophilic N-vinyl amide monomer to a high radical-reactive hydrophilic acrylic monomer in a lens formulation if the low radical-reactive hydrophilic N-vinyl amide monomer is needed, and/or by using a relatively high temperature thermal initiator in a lens formulation, to control the lens properties (e.g., water content, elastic modulus, etc.) and lens processability (capability of dry-delensing from molds) of thermally cast-molded SiHy contact lenses while minimizing loss in photochromic ability of resultant SiHy contact lenses. The invention is partly based on the discovery that, when a photochromic vinylic monomer is added into a base lens formulation with at least one N-vinyl amide monomer as the main polymerizable hydrophilic component for making photochromic SiHy contact lenses based on thermal cast-molding technique, resultant cast-molded lens precurosors are much softer than control lenses (i.e., ones made from the base lens formulation which is free of the photochromic vinylic monomer), cannot be dry-delensed from molds and loss some photochromic ability (i.e., photoactivity). However, it is discovered that when the thermal polymerization of the lens formulation is accelerated by selectively replacing a selected amount of low-radical-reactive N-vinyl amide monomer with a high-radical-reactive hydrophilic monomer, the resultant cast-molded lens precurosors have softness substantially similar to the control and can be dry-delensed from molds and the resultant photochromic SiHy contact lenses have a minimized loss in photochromic ability. It is also discovered that the thermal polymerization of the lens formulation can be accelerated by using a high temperature thermal radical initiator, the resultant cast-molded lens precursors have softness substantially similar to the control and can be dry-delensed from molds, and the resultant photochromic SiHy contact lenses have a minimized loss in photochromic ability.

It is believed that extended exposure of a photochromic compound, such as naphthopyran- or spiroxazine-based photochromic dyes (photochromates), to free radicals could reduce the photochromic ability (photoactivity) due to the degradation of the photochromic compound and also could form stable free radical intermediates, which in turn would impair the lens fabrication process based on free radical polymerization. It is also believed that a relatively faster polymerization system could help with both photoactivity and lens processability. Incorporating more of fast reacting monomers in a lens formulation and/or using a high temperature initiator could help overcome the problems described above, probably because of faster polymerization at the initial stage, free radicals have much less time to interact with photochromic molecules before diffusion limitation sets in.

Higher efficiency and consistency in removing unprocessed molded photochromic silicone hydrogel contact lenses from mold halves can be achieved by selecting a weight ratio of low-radical-reactive hydrophilic N-vinyl amide monomer to a fast-radical-reactive hydrophilic acrylic monomer in a lens formulation (polymerizable composition) and/or using a relatively high temperature thermal initiator to control the lens properties (e.g., water content, elastic modulus, etc.) and lens processability (capability of dry-delensing from molds) of thermally cast-molded SiHy contact lenses. This method of the invention can be easily implemented in a production environment for enhancing the production yield.

The present invention provides a method for producing silicone hydrogel contact lenses, comprising the step of: (1) obtaining a polymerizable composition which is clear at room temperature, wherein the polymerizable composition comprises (a) at least one siloxane-containing polymerizable component which comprises at least one siloxane-containing vinylic monomer, at least one first polysiloxane vinylic crosslinker, or a combination thereof, (b) from about 25% to about 65% (preferably from about 30% to about 65%, more preferably from about 35% to about 65%, even more preferably from about 40% to about 65%) by weight of at least one hydrophilic polymerizable component relative to the total weight of the polymerizable composition, wherein said at least one hydrophilic polymerizable component comprises (preferably consists essentially of, more preferably consists of) (i) at least one hydrophilic N-vinyl amide monomer and/or (ii) at least one hydrophilic acrylic monomer, (c) optionally but preferably at least one non-silicone vinylic crosslinker, (d) from about 5% to about 30% (preferably from about 6% to about 25%, more preferably from about 7% to about 20%, even more preferably from about 8% to about 15%) by weight of at least one hydrophobic acrylic monomer relative to the total weight of the polymerizable composition, wherein the hydrophobic acrylic monomer is capable of forming a homopolymer having a glass-transition temperature $T_g$ of at least about 60° C. (preferably at least about 70° C., more preferably at least about 80° C., even more preferably at least about 90° C.), wherein the hydrophobic acrylic monomer is capable of dissolving components (a) to (c) to form a solution with a concentration of at least about 5% by weight of the components (a) to (c) relative to the solution, (e) from 0 to about 16% (preferably from 0 to about 14%, more preferably from 0 to about 12%) by weight of at least one organic solvent having 2 to 8 carbon atoms (preferably having 3 to 5 carbon atoms) relative to the total weight of the polymerizable composition, (f) at least one photochromic vinylic monomer, and (g) at least one thermal free radical initiator, wherein the sum of the amounts of components (a) to (c) is at least about 67%, (preferably at least about 70%, more preferably at least about 75%) by weight relative to the total weight of the polymerizable composition, wherein weight ratio of component (d) over the sum of components (d) and (e) is at least 0.24 (preferably at least 0.35, more preferably at least 0.45, even more preferably at least 0.55); (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) curing thermally the polymerizable composition in the lens mold to form a unprocessed photochromic silicone hydrogel lens precursor within the lens mold; and (4) subjecting the unprocessed photochromic silicone hydrogel lens precursor to one or more post-molding processes selected from the group consisting of extraction, hydration, packaging, sterilization, and combinations thereof, to form a photochromic silicone hydrogel contact lens. Preferably, the method further comprises, before step (4), a step of separating the mold into the male and female mold halves, with the unprocessed photochromic silicone hydrogel adhered on a lens-adhered mold half which is one of the male and female mold halves; and a step of removing the unprocessed photochromic silicone hydrogel lens precursor from the lens-adhered mold half before the unprocessed photochromic silicone hydrogel lens precursor is contacted with water or any liquid. More preferably, the step of removing the unprocessed photochromic silicone hydrogel lens precursor from the lens-adhered mold half is performed by (a) bringing a ultrasonic horn in direct contact with at least one area of a non-optical surface of the lens-adhered mold half having the unprocessed photochromic silicone hydrogel lens precursor attached thereon and (b) applying a ultrasonic vibrational energy of from about 0.2 to about 18 J to the at least one area of the non-optical surface of the lens-adhered mold half having the unprocessed photochromic silicone hydrogel lens precursor attached thereon so as to remove the unprocessed photochromic silicone hydrogel lens precursor from the lens-adhered mold half.

In a preferred embodiment, weight ratio of component (b)(i) over component (b)(ii) is about 2.0 or less (preferably about 1.8 or less, even more preferably about 1.6 or less and is selected to ensure that the formed photochromic silicone hydrogel contact lens having a specified equilibrium water content (preferably from about 40% to about 65% by weight, more preferably from about 40% to about 60% by weight, even more preferably from about 40% to about 55% by weight) and a specified elastic modulus (preferably from about 0.3 to about 1.5 MPa, more preferably from about 0.4 to about 1.2 MPa, even more preferably from about 0.5 to about 1.0 MPa).

In another preferred embodiment, the thermal free radical initiator is an azo-containing radical initiator having a 10-hour half life temperature of from about 70° C. to about 110° C. (preferably from about 75° C. to about 105° C., more preferably from about 80° C. to about 100° C.), preferably in an amount of from about 0.1% to about 2.0% (preferably from about 0.2% to about 1.75%, more preferably from about 0.3% to about 1.5%, even more preferably from about 0.4% to about 1.25%) by weight relative to the total weight of the polymerizable composition. An azo-containing radical initiator is a free radical initiator containing an azo moiety (*—N=N—*).

In accordance with the invention, a siloxane-containing vinylic monomer can be any vinylic monomer of formula (M1) or (M2)

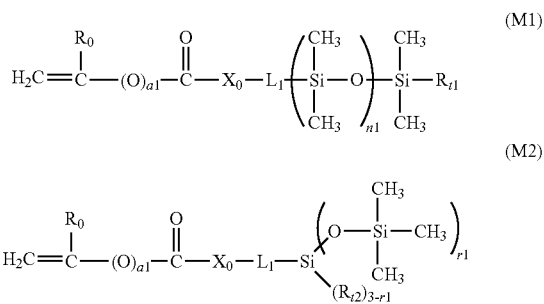

in which: a1 is zero or 1; $R_0$ is H or methyl; $X_o$ is O or $NR_1$; $L_1$ is a $C_2$-$C_8$ alkylene divalent radical or a divalent radical of

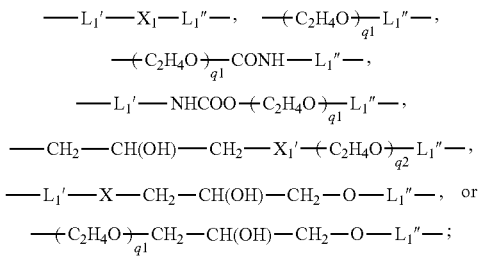

$L_1'$ is $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

Examples of preferred siloxane-containing vinylic monomers of formula (M1) include without limitation α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω—$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[3-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxyethoxypropyl]-terminated ω-$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω—$C_1$-$C_4$-alkyl-terminated polydimethylsiloxane, those disclosed in U.S. Pat. Nos. 9,097,840 and 9,103,965, and mixtures thereof. The above preferred polysiloxanes vinylic monomers of formula (M1) can be obtained from commercial suppliers (e.g., Shin-Etsu, Gelest, etc.) or prepared according to procedures described in patents, e.g., U.S. Pat. Nos. 5,070,215, 6,166,236, 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred siloxane-containing vinylic monomers of formula (M2) include without limitation tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl](meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)-propyloxy)propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred siloxane-containing vinylic monomers can be obtained from commercial suppliers or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups as disclosed in U.S. Pat. App. Pub. No. 2017-0166673 A1, more preferably a polysiloxane vinylic crosslinker of formula (I)

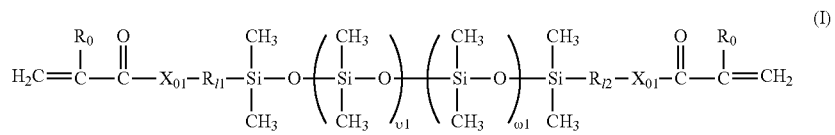

in which:

$\upsilon 1$ is an integer of from 30 to 500 and $\omega 1$ is an integer of from 1 to 75, provided that $\omega 1/\upsilon 1$ is from about 0.035 to about 0.15 (preferably from about 0.040 to about 0.12, even more preferably from about 0.045 to about 0.10);

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

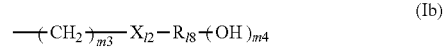

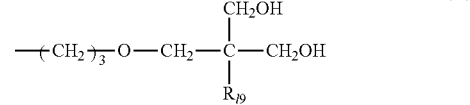

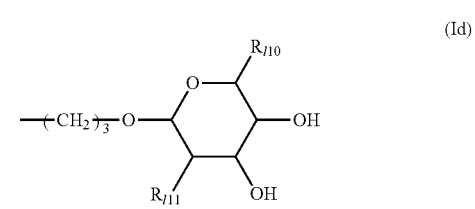

-continued

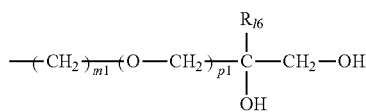
(Ie)

p1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a tertiary amino linkage of —NR$_{I12}$— in which R$_{I12}$ is $C_1$-$C_1$ alkyl, hydroxyethyl, hydroxypropyl, or 2,3-dihydroxypropyl; and
$X_{I2}$ is an amide linkage of

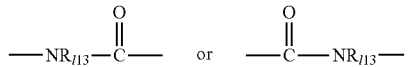

in which $R_{I13}$ is hydrogen or $C_1$-$C_{10}$ alkyl.

In a particularly preferred embodiment, the monovalent radical $R_{I3}$ is a radical of formula (Ie) in which m1 is 3, p1 is 1, and $R_{I6}$ is hydrogen. Such a preferred polysiloxane vinylic crosslinker is represented by formula (A)

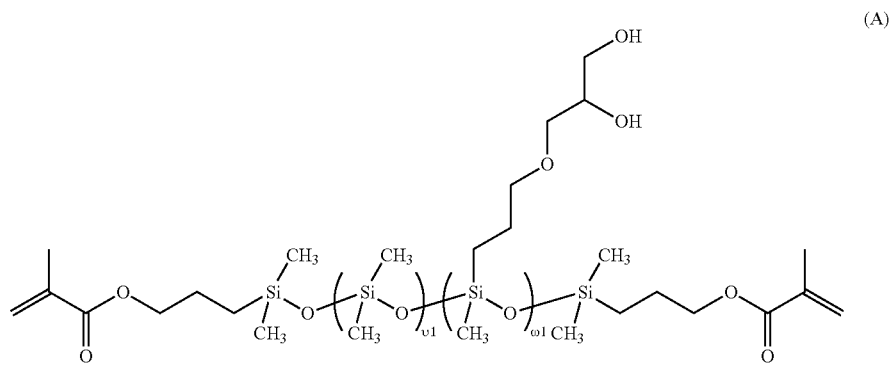
(A)

in which υ1 and ω1 are as defined above.

A polysiloxane vinylic crosslinker of formula (I) can be prepared according to procedures described in U.S. Pat. Appl. Pub. No. 2017-0166673 A1.

Other classes of preferred polysiloxane vinylic crosslinkers are vinylic crosslinkers of any one of formula (1) to (7)

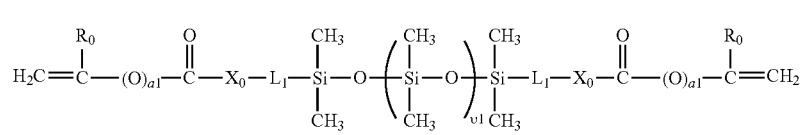
(1)

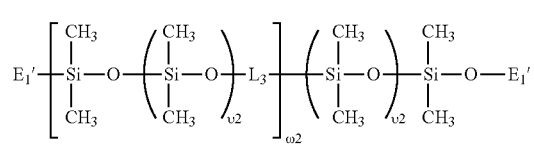
(2)

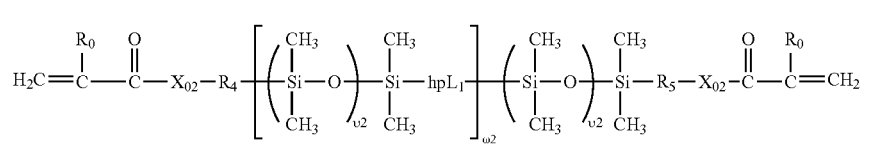
(3)

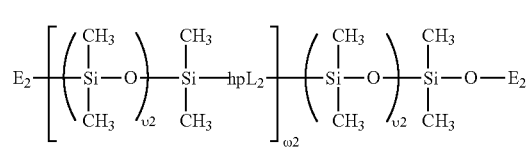
(4)

-continued

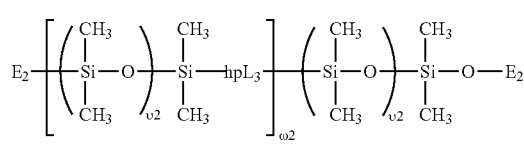 (5)

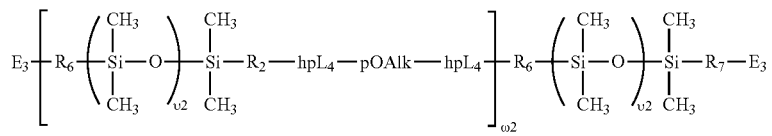 (6)

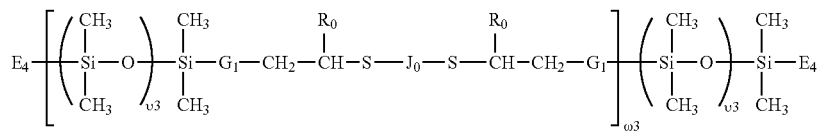 (7)

in which:
- υ1 is an integer of from 30 to 500;
- υ2 is an integer of from 5 to 50;
- υ3 is an integer of from 5 to 100;
- ω2 and ω3 independent of each other are an integer of from 1 to 15;
- a1 and g1 independent of each other is zero or 1;
- h1 is an integer of 1 to 20 and h2 is an integer of 0 to 20;
- m1 and m3 independent of each other is 0 or 1, m2 is an integer of 1 to 6, m4 is an integer of 1 to 5, m5 is 2 or 3;
- q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
- x+y is an integer of from 10 to 30;
- e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
- $R_o$ is H or methyl;
- $R_1$, $R_{1n}$, $R_{2n}$, $R_{3n}$, and $R_{4n}$ independent of one another are H or a $C_1$-$C_4$ alkyl having 0 to 2 hydroxyl group;
- $R_{n5}$ is H or a $C_1$-$C_{10}$ alkyl;
- $R_2$ is a $C_4$-$C_{14}$ hydrocarbon divalent radical;
- $R_3$ is a $C_2$-$C_6$ alkylene divalent radical;
- $R_4$ and $R_5$ independent of each other are a $C_1$-$C_6$ alkylene divalent radical or a $C_1$-$C_6$ alkylene-oxy-$C_1$-$C_6$ alkylene divalent radical;
- $R_6$ and $R_7$ independent of each other are a $C_1$-$C_6$ alkylene divalent radical or a $C_1$-$C_6$ alkoxy-$C_1$-$C_6$ alkylene divalent radical;
- $R_8$ and $R_9$ independent of each other are a substituted or unsubstituted $C_1$-$C_{12}$ alkylene divalent radical;
- $X_o$, $X_1'$, $X_{o1}$, $X_{o2}$, and $X_{o3}$ independent of one another are O or $NR_1$;
- $X_1$ is O, $NR_1$, NHCOO, OCONH, $CONR_1$, or $NR_1CO$;
- $X_{o4}$ is —COO— or —$CONR_{n5}$—;
- $X_{o5}$ and $X_{o7}$ independent of each other are a direct bond, —COO— or —$CONR_{n5}$—;
- $X_{o6}$ is a direct bond, a $C_1$-$C_6$ alkylene divalent radical, a $C_1$-$C_6$ alkylenoxy divalent radical, —COO—, or —$CONR_{n5}$—;
- $X_{o8}$ is a direct bond or —COO—;
- $X_{o9}$ is O or $NR_{n5}$;
- $X_{10}$ is a direct bond, a $C_1$-$C_6$ alkylene divalent radical, —COO—, or —$CONR_{n5}$—;
- $E_1'$ is a monovalent radical of

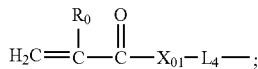

- $E_2$ is a monovalent radical of

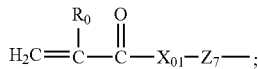

- $E_3$ is a monovalent radical of

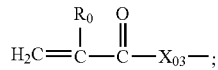

- $E_4$ is a monovalent radical of

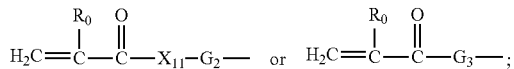

- $L_1$ is a $C_2$-$C_8$ alkylene divalent radical or a divalent radical of

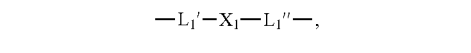
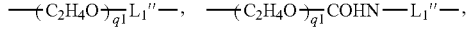
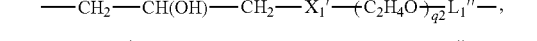
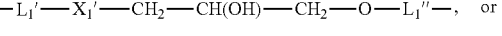

- $L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of

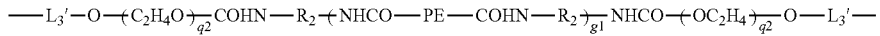

in which PE is a divalent radical of

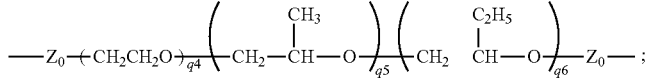

$L_3'$ is $C_3$-$C_8$ alkylene divalent radical;

$L_4$ is a divalent radical of

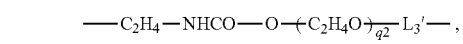
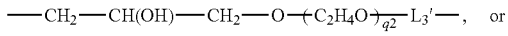
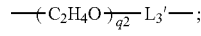

$hpL_1$ is a divalent radical of

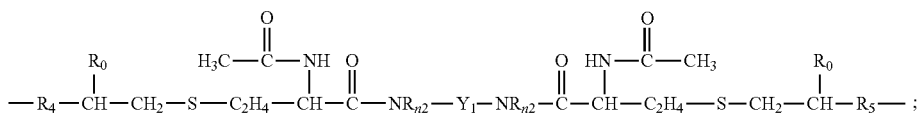

$hpL_2$ is a divalent radical of

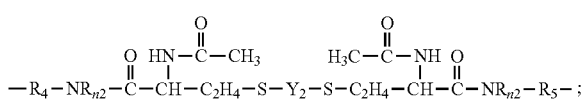

$hpL_3$ is a divalent radical of

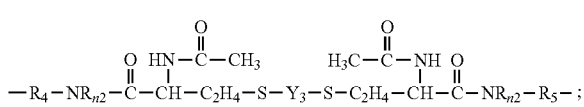

$hpL_4$ is a divalent radical of

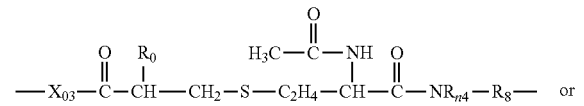

or

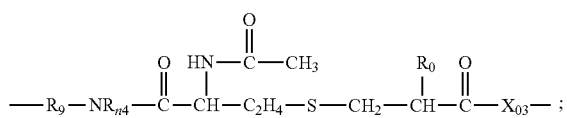

pOAlk is a divalent radical of

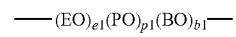

in which EO is an oxyethylene unit (—$CH_2CH_2$—), PO is an oxypropylene unit

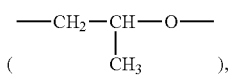

and BO is an oxybutylene unit

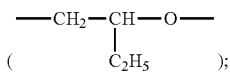

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_6$ alkylene divalent radical;
$J_0$ is a $C_1$-$C_{12}$ hydrocarbon radical having 0 to 2 hydroxyl or carboxyl groups;
G1 is a direct bond, a $C_1$-$C_4$ alkylene divalent radical, or a bivalent radical of

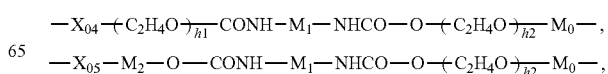
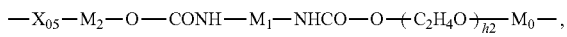

-continued

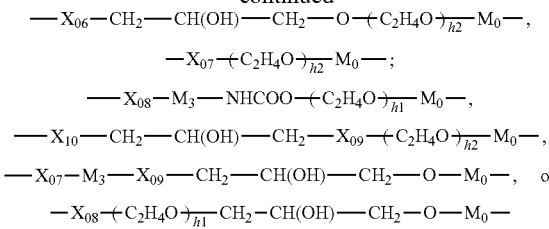

in which $M_0$ is linked to Si atom while $X_{04}$ to $X_{10}$ are linked to the group of —CH$_2$— in formula (7) and at least one of $J_0$ and $G1$ in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof;

$G_2$ is a $C_1$-$C_4$ alkylene divalent radical or a bivalent radical of

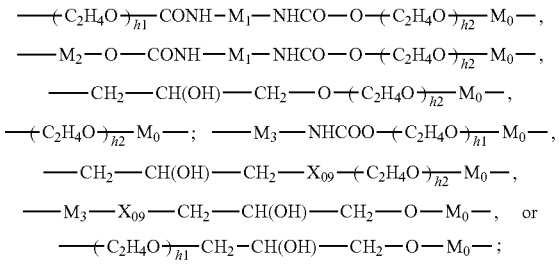

$G_3$ is a divalent radical of

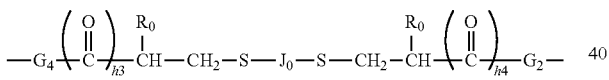

in which h3 and h4 independent of each other are 1 or 0;

G4 is a divalent radical of any one of (a) —NR$_3$'— in which R$_3$' is hydrogen or $C_1$-$C_3$ alkyl, (b)

(c) —NR$_0$-G$_5$-NR$_0$— in which G$_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which G$_6$ is a $C_1$-$C_6$ alkylene divalent radical, a divalent radical of

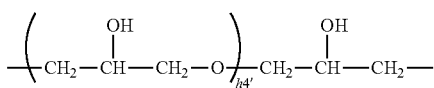

in which h4' is 1 or 2, a divalent radical of

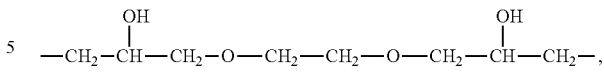

a divalent radical of

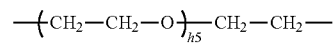

in which h5 is an integer of 1 to 5, a divalent radical of

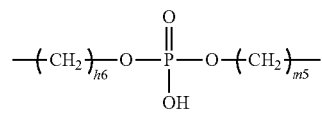

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

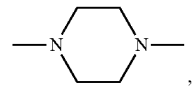

or a divalent radical of

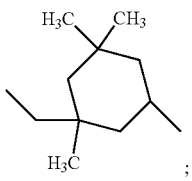

$Y_2$ is a divalent radical of

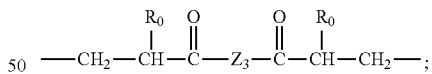

$Y_3$ is a divalent radical of

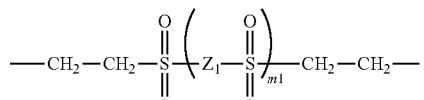

or

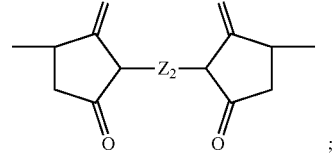

$Z_0$ is a direct bond or a $C_1$-$C_{12}$ alkylene divalent radical;

$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical, $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical, $Z_3$ is a divalent radical of any one of (a) —$NR_{n3}$—, (b)

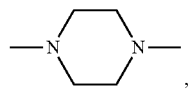

, (c) —$NR_0$—$Z_5$—$NR_0$—, and (d) —O—$Z_6$—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

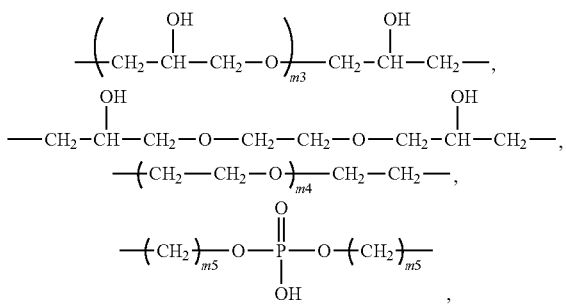

or (c) a substituted $C_3$-$C_8$ alkylene divalent radical having a hydroxyl group or phosphonyloxy group, $Z_7$ is a divalent radical of

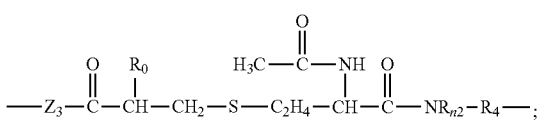

;

and $Z_8$ is a divalent radical of

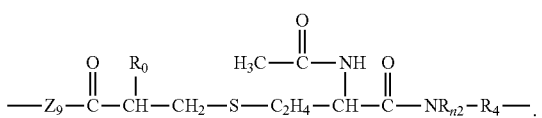

.

Polysiloxane vinylic crosslinkers of formula (1) can be obtained from commercial suppliers, or prepared by reacting glycidyl (meth)acrylate (meth)acryloyl chloride with a di-amino-terminated polydimethylsiloxane or a di-hydroxyl-terminated polydimethylsiloxane, reacting isocyantoethyl (meth)acrylate with di-hydroxyl-terminated polydimethylsiloxanes, reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide). Or reacting a hydroxyl-containing acrylic monomer with a di-hydroxy-terminated polydisiloxane.

Preferred examples of polysiloxane vinylic crosslinkers of formula (1) include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, combinations thereof.

Chain-extended polysiloxane vinylic crosslinkers of formula (2) can be prepared according to the procedures described in U.S. Pat. Nos. 5,034,461, 5,416,132, 5,449,729, 5,760,100, 7,423,074, and 8,529,057. Chain-extended polysiloxane vinylic crosslinkers of formula (3), (4) or (5) can be prepared according to the procedures described in detail in U.S. Pat. App. Pub. No. 2018-0100053 A1. Chain-extended polysiloxane vinylic crosslinkers of formula (6) can be prepared according to the procedures described in detail in U.S. Pat. App. Pub. No. 2018-0100038 A1. Chain-extended polysiloxane vinylic crosslinkers of formula (7) can be prepared according to the procedures described in U.S. Pat. No. 8,993,651.

Another class of preferred chain-extended polysiloxane vinylic crosslinkers are those which each comprise at least two polysiloxane segments and dangling hydrophilic polymer chains each covalently attached to a divalent radical separating each pair of adjacent polysiloxane segments and having at least two pendant hydrophilic groups and/or chains as disclosed in U.S. Pat. Appl. Pub. No. 2012-0088843 A1; those which each comprise at least two polysiloxane segments and dangling hydrophilic polymer chains each covalently attached to a divalent radical separating each pair of adjacent polysiloxane segments as disclosed in U.S. Pat. Appl. Pub. No. 2012-0088844 A1.

In accordance with the invention, any suitable N-vinyl amide monomers can be used in the invention. Examples of preferred N-vinyl amide monomers include without limitation N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred hydrophilic acrylic monomers include without limitation N,N-dimethyl (meth)acrylamide, (meth)acrylamide, N-hydroxylethyl (meth)acrylamide, N-hydroxypropyl (meth)acrylamide, hydroxyethyl methacrylate, glycerol methacrylate (GMA), di(ethylene glycol) (meth)acrylate, tri(ethylene glycol) (meth)acrylate, tetra (ethylene glycol) (meth)acrylate, poly(ethylene glycol) (meth)acrylate having a number average molecular weight of up to 1200, poly(ethylene glycol)ethyl (meth)acrylamide having a number average molecular weight of up to 1200, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, polyethylene glycol (meth)acrylate having a number average molecular weight of up to 1200, polyethylene glycol $C_1$-$C_4$-alkyl ether (meth)acrylate having a number average molecular weight of up to 1200, N-[tris (hydroxymethyl)methyl]-acrylamide, (meth)acrylic acid, ethylacrylic acid, 2-(meth)acrylamidoglycolic acid, phosphorylcholine-containing vinylic monomers (as described below), and combinations thereof. Preferably, the hydrophilic acrylic monomer is N,N-dimethyl (meth)acrylamide, hydroxyethyl (meth)acrylate, N-hydroxylethyl (meth)acrylamide, glycerol methacrylate (GMA), di(ethylene glycol) (meth)acrylate, tri(ethylene glycol) (meth)acrylate, tetra (ethylene glycol) (meth)acrylate, ethylene glycol methyl ether (meth)acrylate, di(ethylene glycol) methyl ether (meth)acrylate, tri(ethylene glycol) methyl ether (meth) acrylate, tetra(ethylene glycol) methyl ether (meth)acrylate, or combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth) acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, a polymerizable composition can comprise about 2.0% or less (preferably about 1.5% or less, more preferably from about 0.1% to about 1.2%) by weight of one or more non-silicone vinylic cross-linkers relative to the total weight of the polymerizable composition.

Examples of preferred non-silicone vinylic cross-linking agents include without limitation ethyleneglycol di-(meth) acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth) acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof.

Any hydrophobic acrylic monomer can be used in the invention, provided that it can form a homopolymer with a $T_g$ of at least about 60° C. (preferably at least about 70° C., more preferably at least about 80° C., even more preferably at least about 90° C.) and that it can dissolve components (a) to (c) to form a solution with a concentration of at least about 5% by weight relative to the total weight of the solution. It is believed that such a hydrophobic acrylic monomer can increase a Tg of the dominant phase of a resultant silicone hydrogel material above the room temperature and may make the unprocessed silicone hydrogel lens precursor more rigid.

Examples of such hydrophobic acrylic monomers includes methyl methacrylate ($T_g$=105° C. of homopolymer), ethyl methacrylate ($T_g$=65° C. of homopolymer), isopropyl methacrylate ($T_g$=81° C. of homopolymer), sec-butyl methacrylate ($T_g$=60° C. of homopolymer), tert-butyl methacrylate ($T_g$=107° C. of homopolymer), cyclohexyl methacrylate ($T_g$=83° C. of homopolymer), isobornyl acrylate ($T_g$=94° C. of homopolymer), isobornyl methacrylate ($T_g$=110° C. of homopolymer), phenyl methacrylate ($T_g$=110° C. of homopolymer), 4-tert-butylstyrene ($T_g$=132° C. of homopolymer), 2-methylstyrene ($T_g$=120° C. of homopolymer), styrene ($T_g$=100° C. of homopolymer), 4-ethoxystyrene ($T_g$=86° C. of homopolymer), 2,4-dimethystyrene ($T_g$=112° C. of homopolymer), 2,5-dimethylstyrene ($T_g$=143° C. of homopolymer), 3,5-dimethylstyrene ($T_g$=104° C. of homopolymer), and combinations thereof. More preferably, methyl methacrylate, tert-butyl methacrylate, cyclohexyl methacrylate, isobornyl acrylate, isobornyl methacrylate, or a combination thereof is used in the invention. Even more preferably, methyl methacrylate, tert-butyl methacrylate, cyclohexyl methacrylate, or a combination thereof is used in the invention.

Examples of preferred organic solvents having 2 to 8 carbon atoms include without limitation, alcohols having 2 to 8 carbon atoms (e.g., ethanol, 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 2-hexanol, 3-hexanol, 2-heptanol, 2-octanol, 2-nonanol, 2-decanol, 3-octanol, 2-methyl-2-pentanol, 2,3-dimethyl-2-butanol, 3-methyl-3-pentanol, 2-methyl-2-hexanol, 3-methyl-3-hexanol, 3-methyl-3-heptanol, 4-methyl-4-heptanol, 2-methyl-2-heptanol, 3-ethyl-3-hexanol, 3-methyl-3-heptanol, 2,4-dimethyl-2-pentanol, 3-ethyl-3-pentanol, 1-methoxy-2-propanol, 3-ethoxy-1-propanol, 1-ethoxy-2-propanol, 1-isobutoxy-2-propanol, 3-methoxy-1-butanol, 1-methoxy-2-butanol, norborneol, 1-methylcyclohexanol, 1-methylcyclopentanol, 1-ethylcyclopentanol, 1-ethylcyclopentanol, 4-hydroxy-4-methyl-1-cyclopentanol, or combinations thereof), dipropylene glycol methyl ether, ethylene glycol n-butyl ether, acetone, methyl ethyl ketone, diethylene glycol n-butyl ether, diethylene glycol methyl ether, propylene glycol methyl ether, propylene glycol methyl ether acetate, propylene glycol n-propyl ether, propylene glycol n-butyl ether, ethyl acetate, butyl acetate, amyl acetate, methyl lactate, ethyl lactate, propyl lactate, 1-methyl-2-pyrrolidone, N,N-dimethylpropionamide, dimethyl formamide, dimethyl acetamide, dimethyl propionamide, N-methyl pyrrolidinone, and mixtures thereof. Preferably, the organic solvent is an alcohol having 3 to 5 carbon atoms (e.g., 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or combinations thereof).

A "photochromic viylic monomer" refers to a compound which comprises one sole ethyleneically unsaturated group and one photochromic moiety capable of undergoing a reversible color change, e.g., from "clear" (i.e., unactivated form) to blue or other color (i.e., activated form), upon exposure to UV-irradiation or HEV light (HEVL). Examples of preferred photochromic vinylic monomers include polymerizable naphthopyrans, polymerizable benzopyrans, polymerizable indenonaphthopyrans, polymerizable phenanthropyrans, polymerizable spiro(benzindoline)naphthopyrans, polymerizable spiro(indoline)benzopyrans, polymerizable spiro(indoline)naphthopyrans, polymerizable spiro(indoline)quinopyrans, polymerizable spiro(indoline)pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)-naphthoxazines, polymerizable spiro(indoline)benzoxazines, polymerizable diarylethenes, and combinations thereof, as disclosed in U.S. Pat. Nos. 4,929,693, 5,166,345 6,017,121, 7,556,750, 7,584,630, 7,999,989, 815,8037, 8,697,770, 8,741,188, 9,052,438, 9,097,916, 9,465,234, 9,904,074, 10,197,707) 6,019,914, 6,113,814, 6,149,841, 6,296,785, 6,348,604.

Any suitable thermal polymerization initiators, known to the skilled artisan, can be used in the invention, so long as they are not oxidizing or reducing agents. Examples of thermal polymerization initiators includes without limitation azo-containing compounds. The polymerization is carried out conveniently in an above-mentioned solvent at elevated temperature, for example at a temperature of from 25 to 10° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, e.g., under $N_2$ or Ar atmosphere.

A polymerizable composition of the invention can also comprise other necessary components known to a person skilled in the art, e.g., for example, a visibility tinting agent (e.g., one or more polymerizable dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

A polymerizable composition of the invention can be prepared by thoroughly blending all of the desirable components.

In a preferred embodiment, a polymerizable composition of the invention comprises: (a) from about 15% to about 55% (preferably from about 20% to about 50%, even more preferably from about 25% to about 45%) by weight of said at least one siloxane-containing polymerizable component; (b) from about 35% to about 65% (preferably from about 40% to about 65%, more preferably from about 45% to about 65%) by weight of at least one hydrophilic polymerizable component; (c) from about 2.0% or less (preferably about 1.5% or less, more preferably from about 0.1% to about 1.2%) by weight of said at least one non-silicone vinylic crosslinkers; (d) from about 5% to about 15% (preferably from about 6% to about 14%, more preferably from about 7% to about 13%, even more preferably from about 8% to about 12%) by weight of said at least one hydrophobic acrylic monomer; (e) from 0 to about 16% (preferably from 0 to about 14%, more preferably from 0 to about 12%) by weight of at least one organic solvent; (f) from about 0.01% to about 6.0% (preferably from about 0.1% to about 4.0%, more preferably from about 0.5% to about 2.0%) by weight of said at least one photochromic vinylic monomer; and (g) from about 0.1% to about 2.0%

(preferably from about 0.2% to about 1.75%, more preferably from about 0.3% to about 1.5%, even more preferably from about 0.4% to about 1.25%) by weight of said at least one thermal free radical initiator, relative to the total amount of all polymerizable components in the polymerizable composition, provided that the sum of the amounts of components (a) to (g) and other not-listed polymerizable components is 100%.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold.

In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

FIG. 1 schematically illustrates a preferred mold 100 used in the methods of the invention. The mold 100 comprises a female mold half 1 and male mold half 2.

The male mold half 2 comprises a base 61, a substantially cylindrical body 25 which extends upward from base 61, a posterior molding surface defining the posterior (concave) surface of a molded contact lens, and an annular shoulder 65 which surrounds the posterior molding surface. The posterior molding surface protrudes outward from the top of body 25.

The annular shoulder 65 shown is flat. It is understood that the annular shoulder 65 can have any suitable surface, such as, e.g., a tilted surface.

The female mold half 1 comprises a base 51, a substantially cylindrical body 15 which extends upward from base 51, an anterior molding surface defining the anterior (convex) surface of a molded contact lens, and a collar 4. The anterior molding surface recesses downward from the top of the body 15. Collar 4 (or up-protruding flange) is preferably integral part of the female mold half 1 and protrudes upward from the top of the body 15. A circumferential groove (or recess) 11 is formed on top of the body 15 between the anterior molding surface and the collar 4 and functions as an overflow for any excess unpolymerized lens-forming material.

The term "collar" as used herein refers to a peripheral circular part which protrudes upward from the top of body of one of the two mating mold halves. A collar can be attached to or preferably integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the anterior and posterior molding surfaces. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount of a polymerizable lens-forming material is typically dispensed into the female mold half 1 by means of a dispensing device and then the male mold half 2 is put on and the mold 100 is closed (FIG. 1). As the mold 100 closes, any excess unpolymerized lens-forming material is pressed into an overflow 11 provided on the female mold half 1. Subsequently, the polymerizable composition in the closed mold 100 is cured thermally in an oven or actinically with UV/visible irradiation.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable composition subsequently is cured (i.e., polymerized) thermally to produce a molded unprocessed photochromic silicone hydrogel lens precursor.

Figure 2:
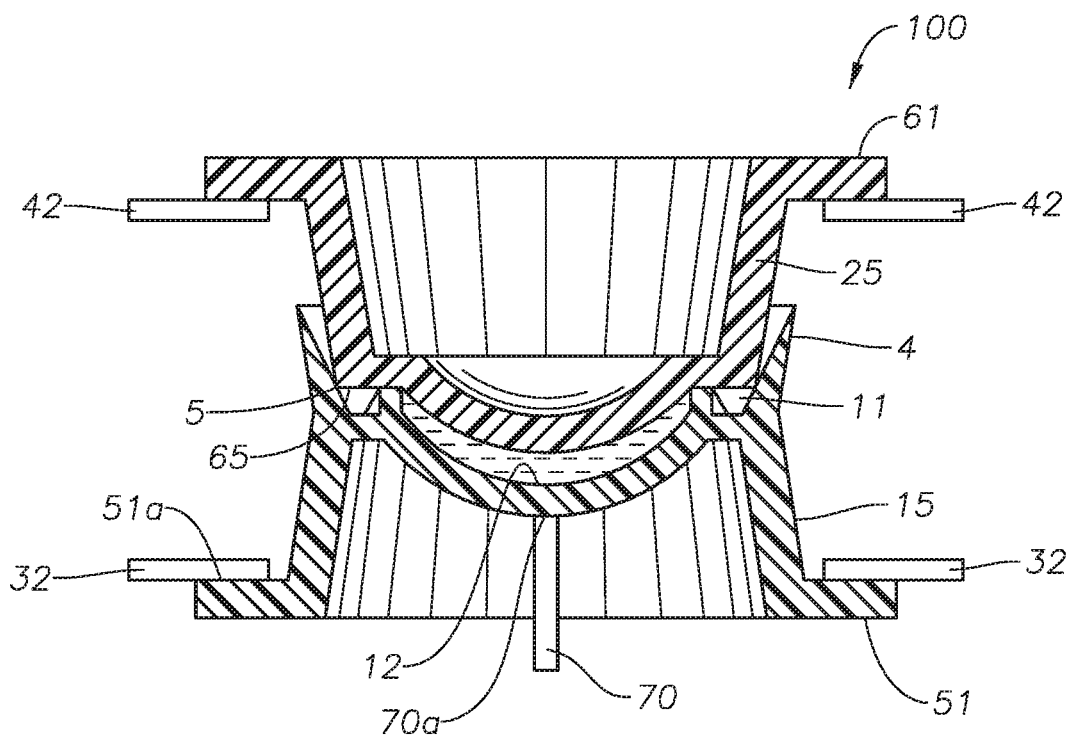
FIG. 2 illustrates schematically a preferred process for separating the male and female mold halves of a mold.

Subsequently, applying a force to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold half which breaks the bonds between the optical molding surface of the female mold half and the molded lens, as shown in FIG. 2. Various ways of applying a force to non-optical surface of the female mold half at a location about the center area of non-optical molding surface along the axis of the mold to deform the female mold half which breaks the bonds between the optical molding surface of the female mold half and the molded lens. It is understood that the mold-opening device can have any configurations known to a person skilled in the art for performing the function of separating two mold halves from each other. For example, referring to FIG. 2, the demolding assembly comprises a pin 70 positionable against the center area of non-optical molding surface of the female mold half. The pin 70 has a flat free end 70a to enable a surface contact between the free end 70a and the center area of non-optical molding surface of the female mold half. It will be appreciated that the scope of the invention is not limited to such a particular flat configuration of the pin end 70a, for example, the pin may have a rounded free end. In the present embodiment, the pin 70 is movable and the female mold half remains stationary by applying a restraining force to the female mold half with a first prying finger 32 for maintaining the female mold half in a fixed position. However, it is possible to arrange the assembly so that the female mold half is movable and the pin 70 remains stationary, or so that both the pin 70 and the female mold half can be moved relative to each other.

In use, during the demolding operation, the free end 70a of the pin 70 applies a longitudinally directed force to the central portion of the non-optical surface of the female mold half. The first prying finger 32 applies a counteractive force against the end face 51a of the flange 51 of the female mold half 1. Consequently, the female mold half is compressed between the free end 70a of the pin 70 and the first finger 32. The compression force deforms the curved part of the female mold half and breaks the adhesive bond between the molding surface of the female mold half 1 and the anterior surface of the molded lens 12.

Then, apply a vertical lifting movement to the male mold half with a second prying finger (while maintaining the restraints on the female mold so as to effectuate gradual separation between the female mold and the male mold.

After breaking the bond between the optical molding surface of the female mold half and the molded lens, the mold is separated, the molded unprocessed photochromic contact lens adheres to the male mold half 2. It is surprising to find out that, according to the present invention, the molded contact lens adhering to the male mold half even though the molding surfaces of the female mold and male mold are not treated before or after dispensing a specific amount of a polymerizable lens-forming material into one of the mold halves to render the molded contact lens preferentially adhered to the female mold or male mold when separating the mold.

According to the present application as mentioned above, the lens typically remains adhered to the male mold section. However, by using similar principle, the compression can be applied to the applying a force to non-optical surface of the male mold half at a location about the center area of non-optical molding surface along the longitudinal axis of the mold to deform the male mold half to compress the female mold half between the pin and the first set of pry fingers so as to break the bonds between the optical molding surface of the male mold half and the molded lens, thereby the molded lens adheres to the female mold half after separating the mold.

Figure 3:
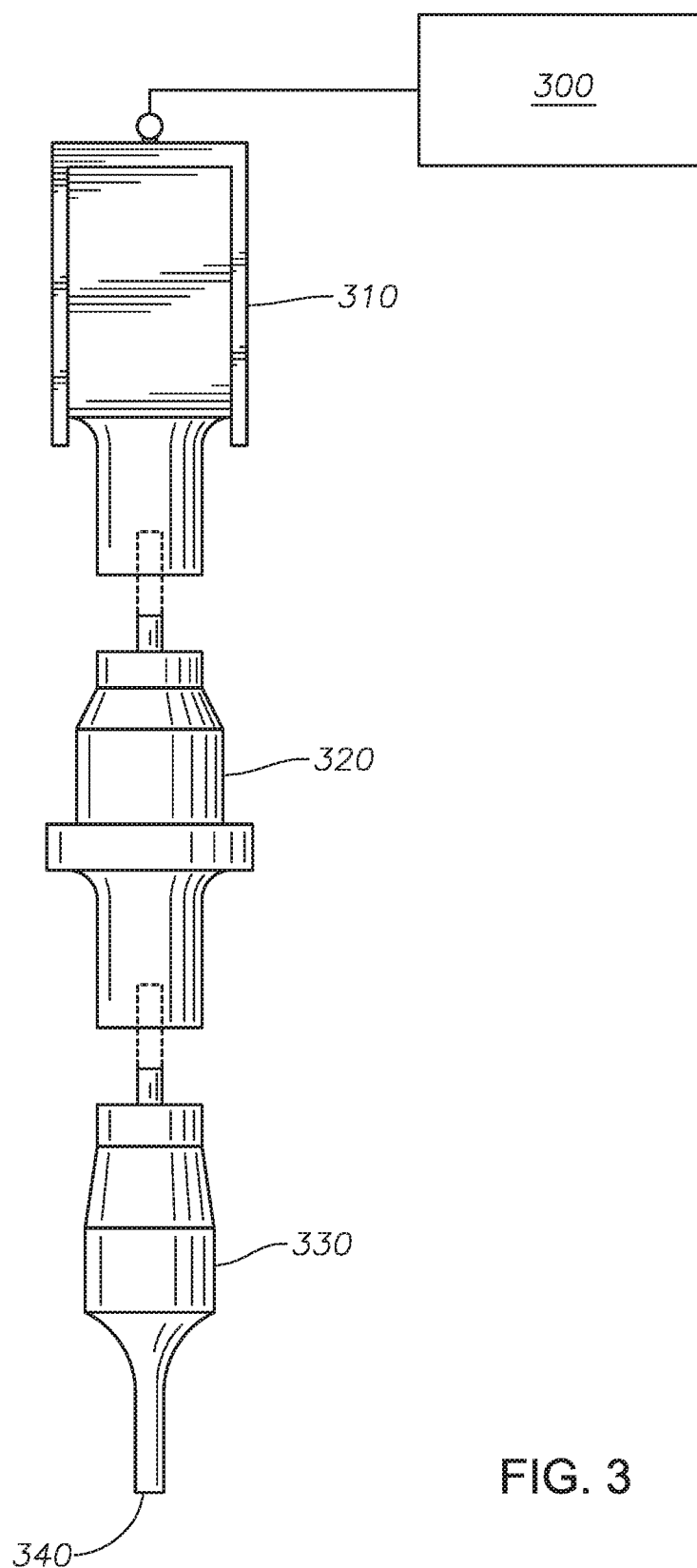
FIG. 3 illustrates an ultrasonic welding system.

According to the present application, an ultrasonic welding system is used not to welding two pieces of plastic material together, but instead to separate molded photochromic silicone hydrogel contact lens from the lens-adhered mold half. An ultrasonic welding system as illustrated in FIG. 3 comprises: a power supply 300 which provides a high power AC signal with frequency matching the resonance frequency of the ultrasonic stack. An ultrasonic stack composed of a converter 310, a booster 320 and a horn 330. All three elements of the stack are specifically tuned to resonate at the same exact ultrasonic frequency (Typically 15, 20, 30, 35, 40 or 70 kHz). The converts the electrical signal into a mechanical vibration. The booster modifies the amplitude of the vibration. The horn can also define the amplitude of vibration and apply the mechanical vibration to the parts to be contacted. However, any kind of mechanical system which transfers the vibrational energy from the converter to the mold half can be used.

Figure 4:
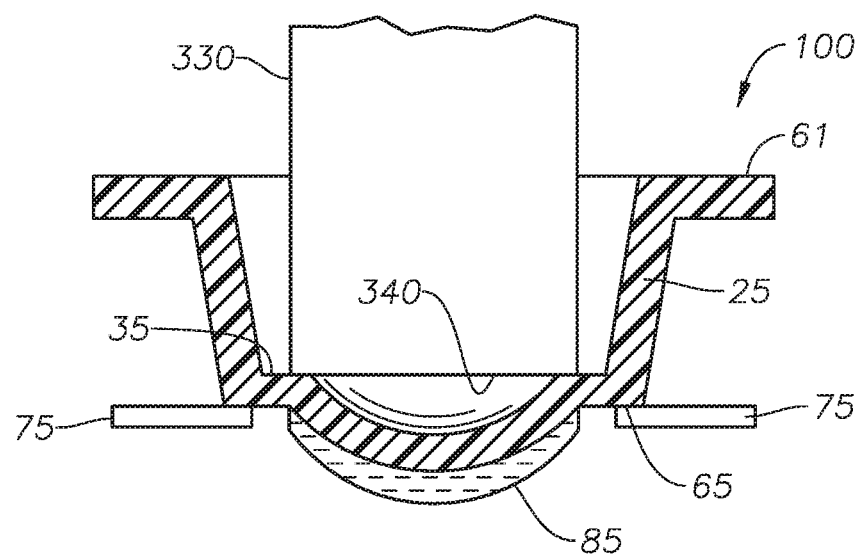
FIG. 4 illustrates a flat ultrasonic horn seated on extended flat edge surround the outer concave surface of the male mold half.

FIG. 4 illustrates an embodiment of the invention wherein an ultrasonic horn 330 having a flat surface 340 is sized to be approximately the outer diameter of the male mold half 2 and seated on extended flat edge surround the outer concave surface 35 (or back surface of the annular shoulder 65 of the male mold half. The male mold half 2 proximate the ultrasonic horn vibrates with the acoustical energy emitted from the ultrasonic horn 330 while the contact lens 85 is attached thereon so that a relative motion at the frequency of the acoustic energy takes place between back surface of the annular shoulder 65 of the male mold half and the contact lens attached thereon. The male mold half and the contact lens attached thereon is held stationary by a position holder 75. A person skilled in the art knows which device can be used as a position holder, for example, a level metal or a cup having an attached level metal. The cup can be used to collect the lens separated from the male mold half. Furthermore, the cup can be attached a vacuum source and the vacuum can assist the separation of the lens from the male mold half.

Figure 5A:
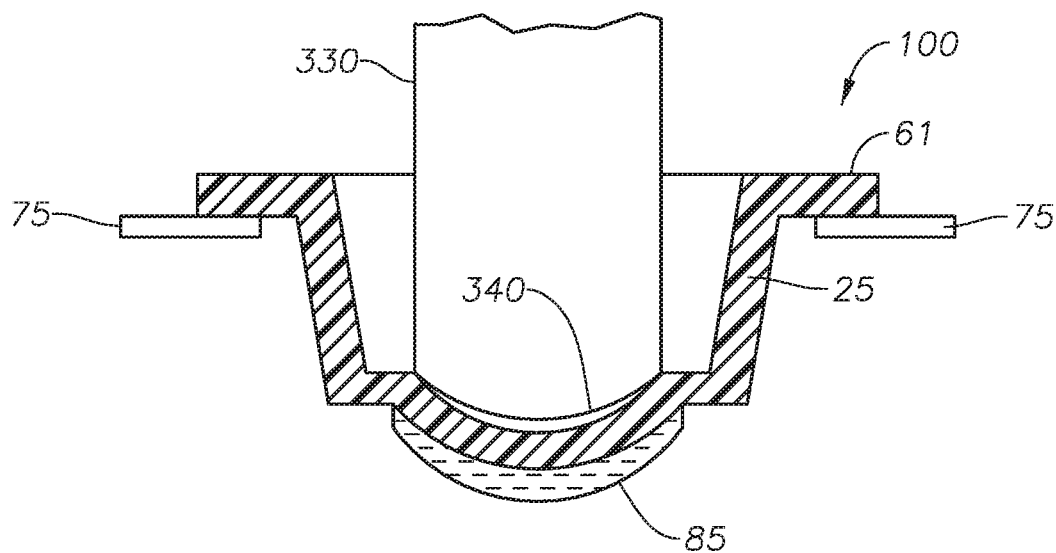
FIGS. 5A and 5B illustrate a convex ultrasonic horn is seated within the outer concave portion of male half mold half.
Figure 5B:
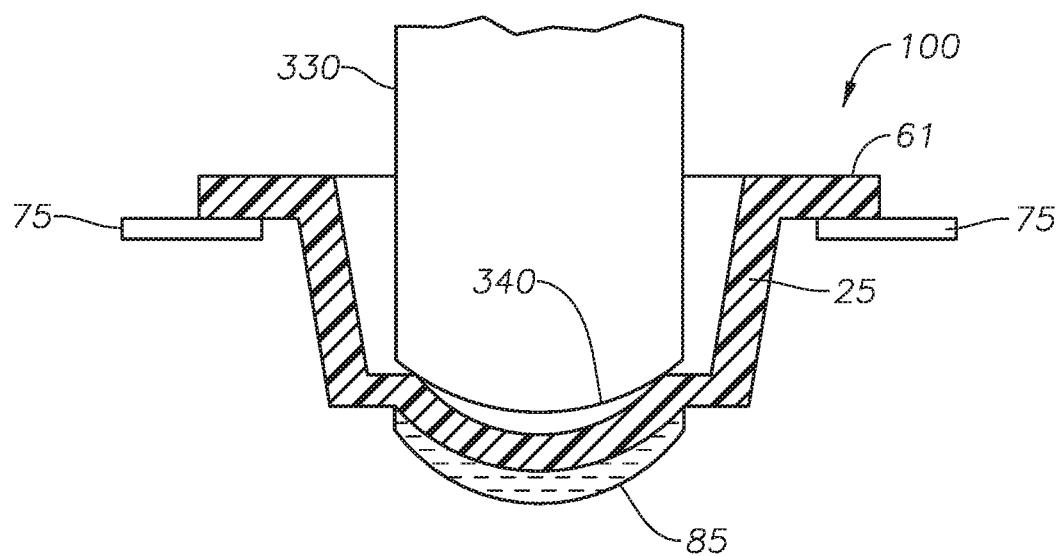

FIGS. 5A and 5B show an embodiment wherein an ultrasonic horn 330 having a convex surface 340 is of a size that allows it to extend within the outer concave portion of male half mold half 2. The male mold half and the contact lens 85 attached thereon is held stationary by a position holder 75. FIG. 5A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer concave portion of male half mold half 2 and the contact lens attached thereon. FIG. 5B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of male half mold half 2 and the contact lens attached thereon.

Figure 6:
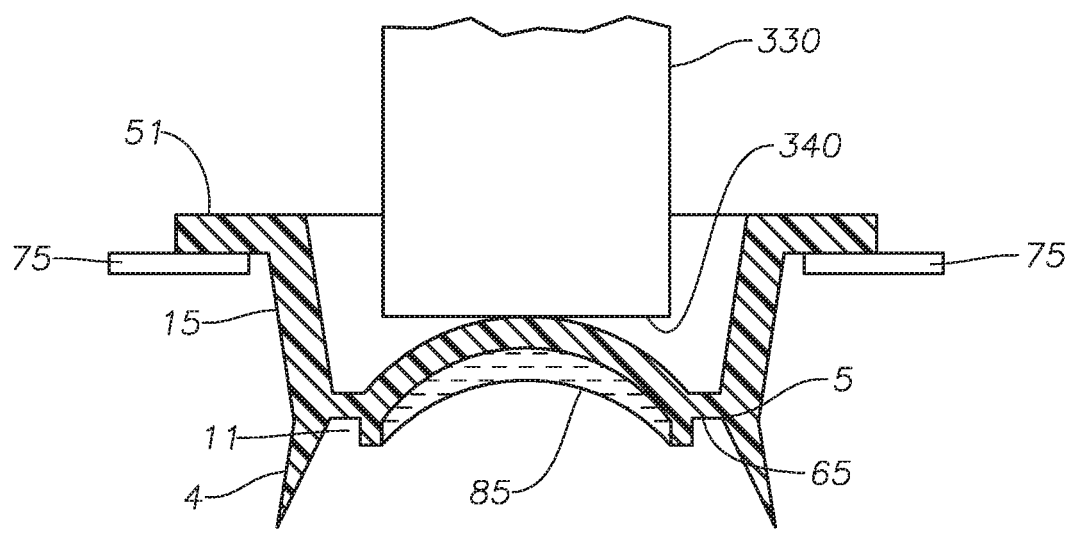
FIG. 6 illustrates a flat ultrasonic horn is sized to be approximately the outer diameter of the female mold half.

FIG. 6 illustrates an embodiment of the invention is shown wherein an ultrasonic horn 330 having a flat surface 340 is sized to be approximately the outer diameter of the female mold half 1 to contact the center area of the outer convex portion of the female mold half.

The female mold half and the contact lens 85 attached thereon is held stationary by a position holder 75. The center portion of back surface (non-optical surface) of the female mold half 1 proximate the ultrasonic horn vibrates with the acoustical energy emitted from the ultrasonic horn 330 while the contact lens is attached thereon so that a relative motion at the frequency of the acoustic energy takes place between the female mold half and the contact lens attached thereon.

Figure 7A:
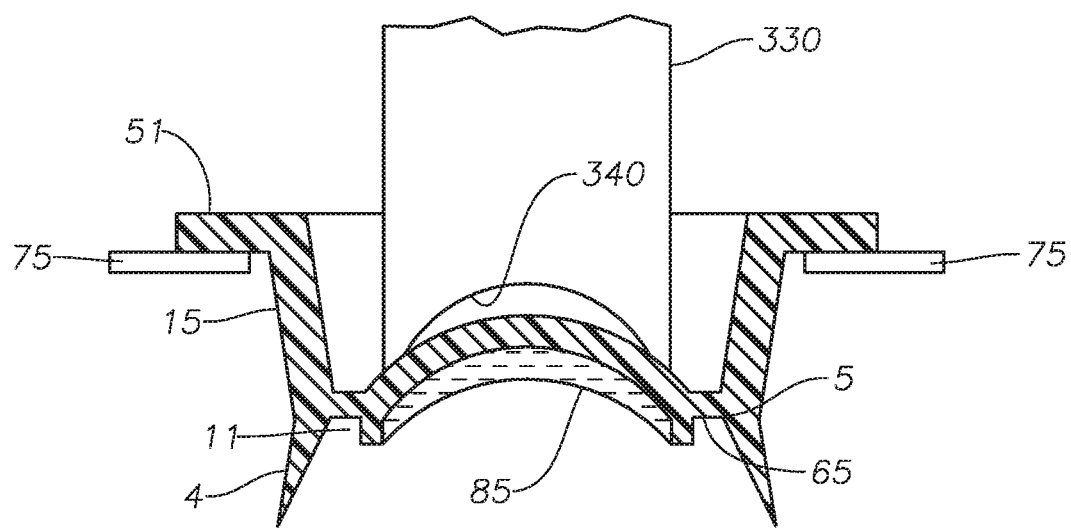
FIGS. 7A and 7B illustrate a concave ultrasonic horn seated within the outer convex portion of female half mold half.
Figure 7B:
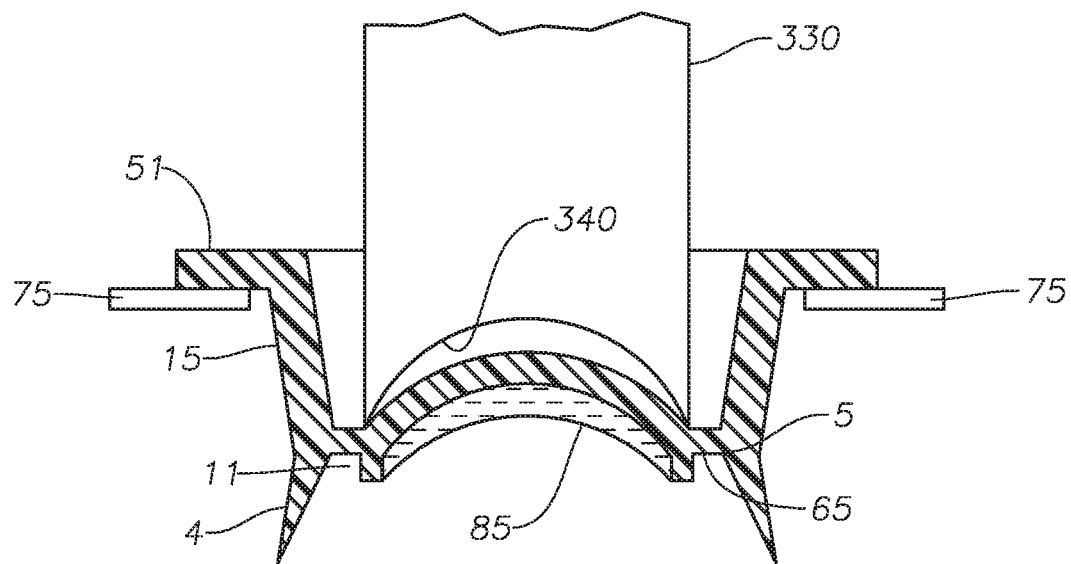

FIGS. 7A and 7B show an embodiment wherein an ultrasonic horn 330 having a concave surface 340 is of a size that allows it to extend within the outer convex portion of female half mold half 1 to contact the center area of the outer convex portion of the female mold half. The female mold half and the contact lens 85 attached thereon is held stationary by a position holder 75. FIG. 7A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer convex portion of female half mold half 1 and the contact lens attached thereon. 7B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of female half mold half 1 and the contact lens attached thereon.

According to the present invention, the modification to the output part of the horn and the preferred parameters associated with operating the system are given in the following.

The ultrasonic welding system is comprised of a power supply 300 which generates a frequency range from 15 kHz to 70 kHz by the use of solid state power devices. This high frequency electrical energy is supplied to a converter 320. This component changes the electrical energy into ultrasonic mechanical vibratory energy at the frequency of the converted electrical energy supply which is typically 15 kHz to 70 kHz. The vibratory ultrasonic acoustical energy is then transmitted through an amplitude modifying device called a booster 320. The booster is a passive (i.e., non-powered) device which is used to modify the output amplitude of the converter before it reaches the horn 330. The horn is shaped to have a flat surface, convex surface, a concave surface, or the like 340 which is an acoustical tool that transfers the vibratory energy directly to the non-optical surface of a mold half.

The present invention is practiced with the above described apparatus as follows: an ultrasonic welding apparatus as described above, the specific system being used for the investigation is a Dukane iQ Series ES Servo Ultrasonic Welding Press System with a 30 kHz generator, 2:1 booster. The generator creates a user settable, high voltage (~1000 Vrms), 30 kHz signal that is applied to the transducer. The transducer expands and contract with this applied voltage and creates a mechanical vibration at the face of the transducer. This vibration is amplified by the booster and horn assembly. To maximize the effectiveness of the mechanical vibration on the part, the vibration needs to be applied in a prescribed manner.

To operate the Dukane Servo system, the ultrasonic horn is lowered to a point in space, where it begins to look for a reaction force equal to the trigger force set by the user. It will continue to move downward at prescribed speed over a short distance looking for that reaction force. When that force is achieved, the system will fire the ultrasonics. Once fired, the horn will seek to move to maintain that constant force. Force mode was chosen to deal with the normal positional variation you would encounter with different parts placed slightly differently from the previous part, as well as slight geometry variations from part to part. The generator output energy equals to the time integral of power. Example process settings are shown in the following table.

| Process Parameter | Setting |
|---|---|
| Generator Frequency | 30 or 40 kHz |
| Booster | 2:1 |
| Horn | 2:1 |
| Trigger Force | 100N |
| Energy | 0.1-40 J |

According to the present invention, Generator Frequency is operated between 15 kHz to 70 kHz, preferably between 20 kHz to 40 kHz, more preferably between 30 kHz to 40 kHz. Trigger Force is operated between 1.0 N to 150N, preferably between 20 N to 120N, more preferably between 40 N to 110N, still more preferably between 80 N to 100N. Energy is operated between 0.1 J to 40 J, preferably between 0.5 J to 30 J, still more preferably between 1.0 J to 20 J. The duration of applying the ultrasonic vibration energy necessary to separate the molded hydrogel contact lens from the female mold half or the male mold half attached thereon is typically less than 10 seconds, preferably less than 5.0 seconds, more preferably less than 2.0 seconds, still more preferably less than 1.0 second.

The unprocessed photochromic silicone hydrogel contact lens can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention.

Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, photochromic silicone hydrogel contact lens can be hydrated in water or an aqueous solution to replace the liquid extraction medium, according to any method known to a person skilled in the art.

The hydrated photochromic silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested.

It is intended that the specification and examples be considered as exemplary.

Example 1

Chemicals

The following abbreviations are used in the following examples: NVP represents N-vinylpyrrolidone; DMA represents N,N-dimethyl acrylamide; MMA represents methyl methacrylate; TEGDMA represent triethyleneglycol dimethacrylate; EGMA represents ethylene glycol methyl ether methacrylate; AMA represents allyl methacrylate; V64 represents 2,2'-dimethyl-2,2'azodipropiononitrile; V88 represents 1,1'-Azobis(cyanocyclohexane) which has a 10-hour half-life temperature of 88° C.; Nobloc is 2-[3-(2H-Benzotriazol-2-yl)-4-hydroxyphenyl]ethyl methacrylate; RB247 is Reactive Blue 247; TAA represents tert-amyl alcohol; PrOH represents 1-propanol; IPA represents isopropanol; PBS represents a phosphate-buffered saline which has a pH of 7.2±0.2 at 25° C. and contains about 0.044 wt % $NaH_2PO_4.H_2O$, about 0.388 wt % $Na_2HPO_4.2H_2O$, and about 0.79 wt % NaCl and; wt % represents weight percent; D6 represents monobutyl-terminated monomethacryloxypropyl-terminated polydimethylsiloxane (M.W. 700 to 800 g/mol from Shin Etsu); "G1" macromer represents a dimethacryloyloxypropyl-terminated polysiloxane (Mn ~7.5-8.1K g/mol, OH content ~1.25-1.55 meq/g) of formula (A) shown above.

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. Pat. Appl. Pub. No. 2012/0026457 A1.

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^4$ mm$^2$/minute.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine the average % transmission (i.e., Luminescence % T) between 380 nm and 780 nm.

Example 2

Preparation of PAA Aqueous Solution

An aqueous solution of polyacrylic acid (PAA) is prepared by adding adequate amount of PAA in water (distilled or deionized water). After PAA is fully dissolved, the pH is adjusted by adding ~1.85% formic acid to the PAA aqueous solution to about 2. The target concentration of PAA is about 0.1% by weight. The prepared PAA aqueous solution is filtered to remove any particulate or foreign matter.

Phosphate Buffered Saline (PBS)

A phosphate buffered saline is prepared by dissolving $NaH_2PO_4.H_2O$, $Na_2HPO_4.2H_2O$, and in a given volume of purified water (distilled or deionized) to have the following composition: ca. 0.044 w/w % $NaH_2PO_4.H_2O$, ca. 0.388 w/w/% $Na_2HPO_4.2H_2O$, and ca. 0.79 w/w % NaCl.

In-Package-Coating Saline (IPC saline)

IPC saline is prepared as follows. Poly(AAm-co-AA)(90/10) partial sodium salt, poly(AAm-co-AA) 90/10, Mw 200,000) is purchased from Polysciences, Inc. and used as received. Kymene or PAE solutions of different solid contents is purchased from Ashland as an aqueous solution and used as received. 0.132 w/w % of PAAm-PAA and about 0.11 w/w % of PAE is mixed together in PBS and pre-treated at 65° C. for about 6 hr. After the heat pre-treatment, the IPC saline is cooled down back to room temperature. Up to 5 ppm hydrogen peroxide may be added to the final IPC saline to prevent bioburden growth and the IPC saline is filtered using a 0.22 micron membrane filter.

Example 3

This example illustrates the adverse effects of a photochromic compound in a lens formulation upon the delensing Preparation of Polymerizable Compositions Three lens formulations (polymerizable compositions), I to III, are prepared to have compositions (in weight unit parts) as shown in Table 1.

TABLE 1

| | Lens Formulation ID (unit weight parts) | | |
|---|---|---|---|
| Components | I | II | III |
| AMA | 0.1 | 0.1 | 0.1 |
| TEGDMA | 0.3 | 0.3 | 0.3 |
| D6 | 34 | 34 | 34 |
| G1 | 6 | 6 | 6 |
| NVP | 40 | 40 | 40 |
| MMA | 9 | 9 | 9 |
| EGMA | 10.2 | 10.2 | 10.2 |
| Photochromate* | 0.78 | 0.78 | 0.78 |
| Nobloc | 1.8 | 1.8 | 1.8 |
| V64 | 0.5 | 1.0 | 1.5 |
| RB 247 | 0.01 | 0.01 | 0.01 |
| TAA | 1 | 1 | 1 |

*Reversacol Volcanic Grey from Vivimed Lab Limited.

The formulations are prepared by adding listed components into a clean bottle, with a stir bar to mix at 600 rpm for 30 min at room temperature. After all the solid is dissolved, a filtration of the formulation is carried out by using 2.7 μm GMF filter.

Cast Molding

A lens formulation is purged with nitrogen at room temperature for 30 to 35 minutes.

The N$_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes.

Mold Separation and Delensing

Lens molds each with a molded silicone hydrogel contact lens precursor therein are mechanically opened as illustrated by FIG. 2 and described above. The molded unprocessed silicone hydrogel contact lens precursors adhere to the male mold halves and are removed mechanically from the male mold halves (i.e., dry-delensed).

Post-Molding Processes

After de-molding and delensing, silicone hydrogel contact lenses are placed in plastic trays. Then the trays with lenses are immersed in the PAA solution prepared above for about 2 hours and then immersed in PBS for about 5 minutes to one hour at room temperature for forming PAA-coated SiHy lenses. Adequate agitation (e.g. horizontal shaking or up-down movement) is used to ensure appropriate flow of PAA solution and PBS during immersion.

Then, PAA-coated SiHy lenses prepared above are placed in polypropylene lens packaging shells (one lens per shell) with 0.55 mL or 0.65 ml of the IPC saline (about half of the saline may be added prior to inserting the lens). The blisters are then sealed with foil and autoclaved for about 45 minutes at about 121° C., forming SiHy contact lenses with cross-linked coatings (PAA-x-hydrophilic polymeric material) thereon.

Characterization of Processability and Photoactivity

The processability and photoactivity of molded SiHy contact lenses are assessed and the results are reported in Table 2.

TABLE 2

| | Lenses prepared from Lens Formulation No. | | |
|---|---|---|---|
| | I | II | III |
| Color of lens formulation | Light grey | Light grey | Light grey |
| Color of molded lens | colorless | slightly yellow | slightly yellow |
| Demolding of molded lens | Yes | Yes | Yes |
| Dry Delensing of molded lens | No | No | No |
| Photoactivity of packaged lens | partially lost | Lost | Lost |

Example 4

This example illustrates the effects of replacement of N-vinyl amide monomer with DMA in a lens formulation upon the delensing and photochromic activity of molded SiHy contact lenses.

Preparation of Polymerizable Compositions

Four lens formulations (polymerizable compositions), IV to VII, are prepared to have compositions (in weight unit parts) as shown in Table 3.

TABLE 3

| | Lens Formulation No. | | | |
|---|---|---|---|---|
| | IV | V | VI | VII |
| AMA | 0.1 | 0.1 | 0.1 | 0.1 |
| TEGDMA | 0.3 | 0.3 | 0.3 | 0.3 |
| D6 | 34 | 34 | 34 | 34 |
| G1 | 6 | 6 | 6 | 6 |
| DMA | 40 | 40 | 40 | 40 |
| MMA | 9 | 9 | 9 | 9 |
| EGMA | 10.2 | 10.2 | 10.2 | 10.2 |
| Photochromate | 0 | 0.50$^a$ | 0.50$^b$ | 0.50$^c$ |
| Nobloc | 1.8 | 1.8 | 1.8 | 1.8 |
| V64 | 0.5 | 0.5 | 0.5 | 0.5 |
| TAA | 1 | 1 | 1 | 1 |

$^a$Spiropyran (1',3'-Dihydro-8-methoxy-1',3',3'-trimethyl-6-nitrospiro[2H-1-benzopyran-2,2'-(2H)-indole]) from Aldrich;
$^b$Plum red (a Naphthoxizine compound) from Vivimed Lab Limited;
$^c$Volcanic grey (a Naphthopyran compound) from Vivimed Lab Limited.

The formulations are prepared by adding listed components into a clean bottle, with a stir bar to mix at 600 rpm for 30 min at room temperature. After all the solid is dissolved, a filtration of the formulation is carried out by using 5 μm GMF filter.

Cast Molding

Cast molding of lens formulation is carried out as described in Example 3.

Mold Separation and Delensing

Mold separation and delensing are carried out as described in Example 3.

Post-Molding Processes

After do-molding and delensing, silicone hydrogel contact lenses are subjected to post-molding processes as described in Example 3.

Characterization of Processability and Photoactivity

The processability and photoactivity of molded SiHy contact lenses are assessed and the results are reported in Table 4.

TABLE 4

| | Lenses prepared from Lens Formulation No. | | | | |
|---|---|---|---|---|---|
| | IV | V | VI | VII | VIII |
| Color of lens formulation | Light lemon | blue | pink | light grey | light grey |
| Color of molded lens | colorless | yellow | very faint pink | clear | clear |
| Demolding of molded lens | Yes | Yes | Yes | Yes | Yes |
| Dry Delensing of molded lens | Yes | Yes | Yes | Yes | Yes |
| Lens color after UV irradiation | colorless | Dark blue | purple | grey | dark grey |

Example 5

This example illustrates the effects of various binary photochromic dye systems in a lens formulation upon the delensing and photochromic activity of molded SiHy contact lenses.

Preparation of Polymerizable Compositions

Three lens formulations (polymerizable compositions), VIII to X, are prepared to have compositions (in weight unit parts) as shown in Table 5.

TABLE 5

| | Lens Formulation ID (unit weight parts) | | |
|---|---|---|---|
| Components | VIII | IX | X |
| TEGDMA | 0.3 | 0.3 | 0.3 |
| D6 | 34 | 34 | 34 |
| G1 | 6 | 6 | 6 |
| DMA | 20 | 20 | 20 |
| MMA | 9 | 9 | 9 |
| EGMA | 10.2 | 10.2 | 10.2 |
| Photochromate-1[d] | 0.5 | 1 | 1 |
| Photochromate-2[e] | 1.5 | 1 | 3 |
| Nobloc | 1.8 | 1.8 | 1.8 |
| V64 | 0.5 | 0.5 | 0.5 |
| RB 247 | 0.01 | 0.01 | 0.01 |
| TAA | 5 | 5 | 5 |

[d]Reversacol ® Humber Blue from Vivimed Lab Ltd.;
[e]Reversacol Penien Green from Vivimed Lab Ltd.

The formulations are prepared by adding listed components into a clean bottle, with a stir bar to mix at 600 rpm for 30 min at room temperature. After all the solid is dissolved, a filtration of the formulation is carried out by using 2.7 μm GMF filter.

Cast Molding

Cast molding of a lens formulation is carried out as described in Example 3.

Mold Separation and Delensing

Mold separation and delensing are carried out as described in Example 3.

Post-Molding Processes

After de-molding and delensing, silicone hydrogel contact lenses are subjected to post-molding processes as described in Example 3.

Characterization of Processability and Photoactivity

Figure 8:
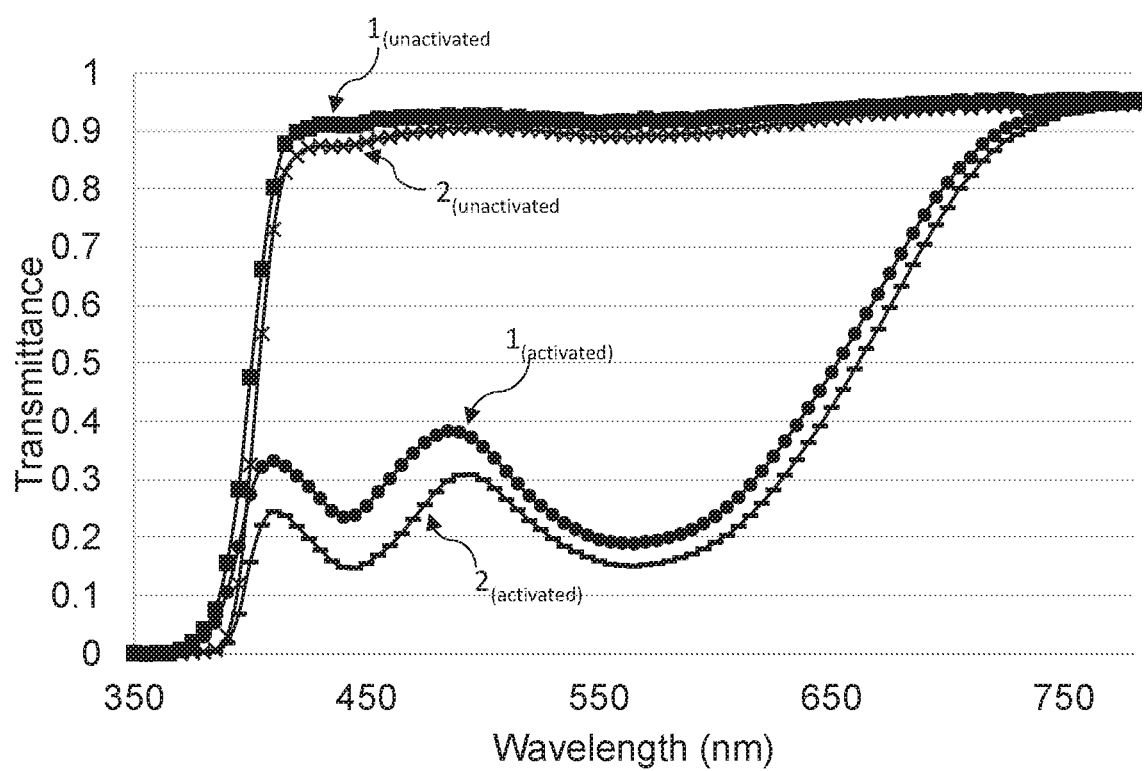
FIG. 8 shows the UV/visible absorption spectra of photochromic silicone hydrogel contact lenses: Curve $1_{(unactivated)}$—the absorption spectrum of photochromic silicone hydrogel contact lens prepared from formulation VIII in unactivated state (without irradiation with UV/HEVL); Curve $1_{(activated)}$—the absorption spectrum of photochromic silicone hydrogel contact lens prepared from formulation VIII in activated state (with irradiation with UV/HEVL); Curve $2_{(activated)}$—the absorption spectrum of photochromic silicone hydrogel contact lens prepared from formulation X in unactivated state (without irradiation with UV/HEVL); Curve $2_{(activated)}$—the absorption spectrum of photochromic silicone hydrogel contact lens prepared from formulation X in activated state (with irradiation with UV/HEVL).

The photochromic activity (activated and non-activated states) reflected in the light spectrum measurements of photochromic SiHy contact lenses from formulations VIII and X are shown in FIG. 8.

All the publications, patents, and patent application publications, which have been cited herein above, are hereby incorporated by reference in their entireties.

What is claimed is:

1. A method for producing silicone hydrogel contact lenses, comprising the steps of:
    (1) obtaining a polymerizable composition which is clear at room temperature, wherein the polymerizable composition comprises
        (a) at least one siloxane-containing polymerizable component which comprises at least one siloxane-containing vinylic monomer, at least one polysiloxane vinylic crosslinker, or a combination thereof,
        (b) from about 25% to about 65% by weight of at least one hydrophilic polymerizable component relative to the total weight of the polymerizable composition, wherein said at least one hydrophilic polymerizable component comprises (i) at least one hydrophilic N-vinyl amide monomer and/or (ii) at least one hydrophilic acrylic monomer,
        (c) optionally at least one non-silicone vinylic crosslinker,
        (d) from about 5% to about 30% by weight of at least one hydrophobic acrylic monomer relative to the total weight of the polymerizable composition, wherein the hydrophobic acrylic monomer is capable of forming a homopolymer having a glass-transition temperature $T_g$ of at least about 60° C., wherein the hydrophobic acrylic monomer is capable of dissolving components (a) to (c) to form a solution with a concentration of at least about 5% by weight of the components (a) to (c) relative to the solution,
        (e) from 0 to about 16% by weight of at least one organic solvent having 2 to 8 carbon atoms relative to the total weight of the polymerizable composition,
        (f) at least one photochromic vinylic monomer, and
        (g) at least one thermal free radical initiator, wherein the sum of the amounts of components (a) to (c) is at least about 67%, by weight relative to the total weight of the polymerizable composition, wherein weight ratio of component (d) over the sum of components (d) and (e) is at least 0.24;
    (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
    (3) curing thermally the polymerizable composition in the lens mold to form a unprocessed photochromic silicone hydrogel lens precursor within the lens mold; and
    (4) subjecting the unprocessed photochromic silicone hydrogel lens precursor to one or more post-molding processes selected from the group consisting of extraction, hydration, packaging, sterilization, and combinations thereof, to form a photochromic silicone hydrogel contact lens.

2. The method of claim 1, wherein the hydrophobic acrylic monomer is methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, or a combination thereof.

3. The method of claim 2, wherein the organic solvent has 3 to 5 carbon atoms.

4. The method of claim 3, wherein the organic solvent is 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or a combination thereof.

5. The method of claim 4, further comprising: before step (4), a step of separating the mold into the male and female mold halves, with the unprocessed photochromic silicone hydrogel adhered on a lens-adhered mold half which is one of the male and female mold halves; and a step of removing the unprocessed photochromic silicone hydrogel lens precursor from the lens-adhered mold half before the unprocessed photochromic silicone hydrogel lens precursor is contacted with water or any liquid.

6. The method of claim 5, wherein the step of removing the unprocessed photochromic silicone hydrogel lens precursor from the lens-adhered mold half is performed by (a) bringing a ultrasonic horn in direct contact with at least one area of a non-optical surface of the lens-adhered mold half having the unprocessed photochromic silicone hydrogel lens precursor attached thereon and (b) applying a ultrasonic vibrational energy of from about 0.2 to about 18 J to the at least one area of the non-optical surface of the lens-adhered mold half having the unprocessed photochromic silicone hydrogel lens precursor attached thereon so as to remove the unprocessed photochromic silicone hydrogel lens precursor from the lens-adhered mold half.

7. The method of claim 4, wherein said at least one hydrophilic polymerizable component comprises (i) at least one hydrophilic N-vinyl amide monomer and (ii) at least one hydrophilic acrylic monomer.

8. The method of claim 7, wherein weight ratio of component (b)(i) over component (b)(ii) is about 2.0 or less and is selected to ensure that the formed photochromic silicone hydrogel contact lens having a specified equilibrium water content and a specified elastic modulus.

9. The method of claim 8, wherein the specified equilibrium water content is from about 40% to about 65% by weight and a specified elastic modulus of from about 0.3 to about 1.5 MPa.

10. The method of claim 9, wherein the thermal free radical initiator is an azo-containing radical initiator having a 10-hour half life temperature of from about 70° C. to about 110° C.

11. The method of claim 10, wherein the thermal free radical initiator is present in an amount of from about 0.1% to about 2.0% by weight relative to the total weight of the polymerizable composition.

12. The method of claim 11, wherein the polymerizable composition comprises (c) about 2.0% or less by weight of at least one non-silicone vinylic crosslinker relative to the total weight of all polymerizable components in the polymerizable composition, wherein said at least non-silicone vinylic crosslinker is ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth) acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, or combinations thereof.

13. The method of claim 12, wherein the polymerizable composition comprises (a) from about 15% to about 55% by weight of said at least one siloxane-containing polymerizable component relative to the total weight of the polymerizable composition.

14. The method of claim 13, wherein the polymerizable composition comprises at least one siloxane-containing vinylic monomer which is a vinylic monomer of formula (M1) or (M2)

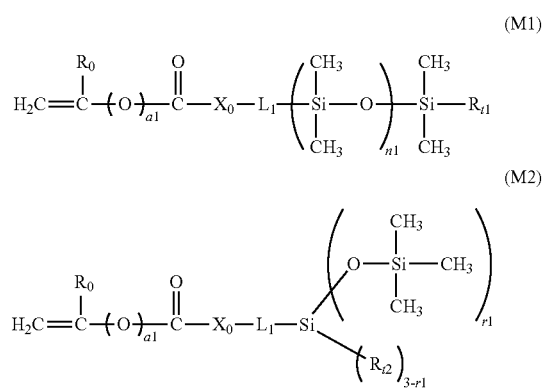

in which: a1 is zero or 1; $R_o$ is H or methyl; $X_o$ is O or $NR_1$; $L_1$ is $C_2$-$C_8$ alkylene divalent radical or a divalent radical of

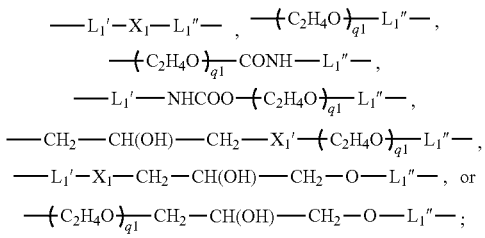

$L_1'$ is $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

15. The method of claim 13, wherein the polymerizable composition comprises at least one siloxane-containing vinylic monomer which is: tris(trimethylsilyloxy)silylpropyl (meth)acrylate, [3-(meth)acryloxy-2-hydroxypropyloxy] propylbis(trimethylsiloxy) methylsilane, [3-(meth)acryloxy- 2-hydroxypropyloxy]propylbis(trimethylsiloxy)butylsilane, 3-(meth)acryloxy-2-(2-hydroxyethoxy)-propyloxy)propyl-bis(trimethylsiloxy)methylsilane, 3-(meth)acryloxy-2-hydroxypropyloxy)propyltris(trimethylsiloxy)silane, N-[tris (trimethylsiloxy)silylpropyl]-(meth)acrylamide, N-(2-hydroxy-3-(3-(bis(trimethylsilyloxy)methylsilyl)propyloxy)-propyl)-2-methyl (meth)acrylamide, N-(2-hydroxy-3-(3-(bis(trimethylsilyloxy)methylsilyl)-propyloxy)propyl) (meth)acrylamide, N-(2-hydroxy-3-(3-(tris(trimethylsilyloxy)silyl)-propyloxy)propyl)-2-methyl acrylamide, N-(2-hydroxy-3-(3-(tris(trimethylsilyloxy)silyl)-propyloxy)propyl) (meth)acrylamide, N-[tris(dimethylpropylsiloxy)silylpropyl]-(meth)acrylamide, N-[tris(dimethylphenylsiloxy) silylpropyl] (meth)acrylamide, N-[tris (dimethylethylsiloxy)silylpropyl] (meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris (trimethylsilyloxy)-silyl)propyloxy)propyl](meth)acrylamide, N-[2-hydroxy-3-(3-(t-butyldimethylsilyl)-propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth) acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxy-isopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

16. The method of claim 13, wherein the polymerizable composition comprises at least one polysiloxane vinylic crosslinker which is a vinylic crosslinker of formula (I)

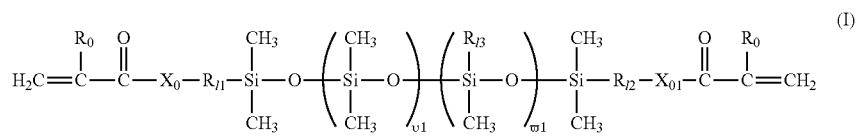

in which:

υ1 is an integer of from 30 to 500 and ω1 is an integer of from 1 to 75, provided that ω1/υ1 is from about 0.035 to about 0.15;

$X_{01}$ is O or $NR_N$ in which $R_N$ is hydrogen or $C_1$-$C_{10}$-alkyl;

$R_o$ is hydrogen or methyl;

$R_{l1}$ and $R_{l2}$ independently of each other are a substituted or unsubstituted $C_1$-$C_{10}$ alkylene divalent radical or a divalent radical of —$R_{l4}$—O—$R_{l5}$— in which $R_{l4}$ and $R_{l5}$ independently of each other are a substituted or unsubstituted $C_1$-$C_{10}$ alkylene divalent radical;

$R_{l3}$ is a monovalent radical of any one of formula (Ia) to (Ie)

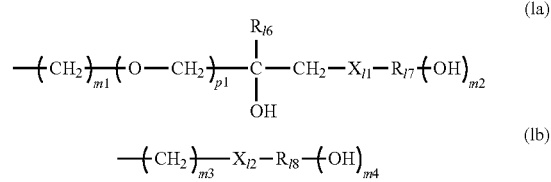

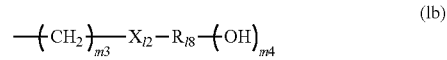

-continued

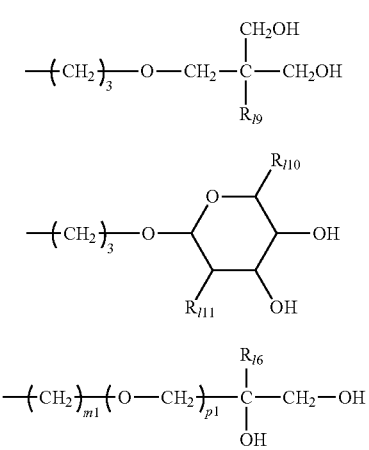

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

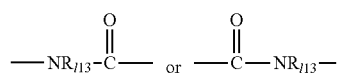

in which $R_{I13}$ is hydrogen or $C_1$-$C_{10}$ alkyl.

17. The method of claim 13, wherein the polymerizable composition comprises at least one polysiloxane vinylic crosslinker which is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or a combination thereof.

18. The method of claim 13, wherein said at least one hydrophilic N-vinyl amide monomer is N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, or a mixture thereof.

19. The method of claim 18, wherein said at least one hydrophilic acrylic monomer is N,N-dimethyl (meth)acrylamide, (meth)acrylamide, N-hydroxylethyl (meth)acrylamide, N-hydroxypropyl (meth)acrylamide, hydroxyethyl methacrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1200, poly(ethylene glycol)ethyl (meth)acrylamide having a number average molecular weight of up to 1200, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, polyethylene glycol (meth)acrylate having a number average molecular weight of up to 1200, polyethylene glycol $C_1$-$C_4$-alkyl ether (meth)acrylate having a number average molecular weight of up to 1200, N-[tris (hydroxymethyl)methyl]-acrylamide, (meth)acrylic acid, ethylacrylic acid, 2-(meth)acrylamidoglycolic acid, phosphorylcholine-containing vinylic monomers, and combinations thereof.

20. The method of claim 13, wherein said at least one photochromic vinylic monomer is a polymerizable naphthopyran, a polymerizable benzopyran, a polymerizable indenonaphthopyran, a polymerizable phenanthropyran, a polymerizable spiro(benzindoline)naphthopyran, a polymerizable spiro(indoline)benzopyran, a polymerizable spiro (indoline)naphthopyran, a polymerizable spiro(indoline) quinopyran, a polymerizable spiro(indoline)pyran, a polymerizable naphthoxazine, a polymerizable spirobenzopyran, a polymerizable spirobenzopyran, a polymerizable spirobenzothiopyran, a polymerizable naphthacenedione, a polymerizable spirooxazine, a polymerizable spiro(indoline) naphthoxazine, a polymerizable spiro(indoline)pyridobenzoxazine, a polymerizable spiro(benzindoline)pyridobenzoxazine, a polymerizable spiro(benzindoline)naphthoxazine, a polymerizable spiro(indoline)benzoxazine, a polymerizable diarylethene, or a combination thereof.

* * * * *